(12) United States Patent
Han et al.

(10) Patent No.: US 9,819,897 B2
(45) Date of Patent: Nov. 14, 2017

(54) DIGITAL PHOTOGRAPHING APPARATUS CAPABLE OF RECONFIGURING IMAGE SIGNAL PROCESSOR AND METHOD OF CONTROLLING THE SAME

(71) Applicant: SAMSUNG ELECTRONICS CO., LTD., Suwon-si (KR)

(72) Inventors: Hee-chul Han, Hwaseong-si (KR); Sung-ho Lee, Dangjin-si (KR); Hyun-jung Kim, Suwon-si (KR); Ji-yeon Han, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

(21) Appl. No.: 14/564,858

(22) Filed: Dec. 9, 2014

(65) Prior Publication Data
US 2015/0163442 A1 Jun. 11, 2015

(30) Foreign Application Priority Data

Dec. 9, 2013 (KR) .................. 10-2013-0152647
Aug. 14, 2014 (KR) .................. 10-2014-0106229

(51) Int. Cl.
| | | |
|---|---|---|
| *H04N 5/225* | (2006.01) | |
| *H04N 5/232* | (2006.01) | |
| *G06F 15/173* | (2006.01) | |
| *H04N 5/77* | (2006.01) | |

(52) U.S. Cl.
CPC .......... *H04N 5/772* (2013.01); *H04N 5/2257* (2013.01)

(58) Field of Classification Search
CPC ..... H04N 2201/0008; H04N 2201/001; H04N 2201/0015; H04N 2201/0017; H04N 2201/0018

USPC ..... 34/207.1, 211.3, 211.4, 211.11; 709/223; 725/105; 348/207.1, 211.3, 211.4, 348/211.11, 207.11

See application file for complete search history.

(56) References Cited

U.S. PATENT DOCUMENTS

| | | | | |
|---|---|---|---|---|
| 5,748,862 A | * | 5/1998 | Ohno | ..................... G06K 15/00 358/1.16 |
| 5,900,948 A | * | 5/1999 | Shigeeda | ................. G06T 3/40 358/447 |

(Continued)

FOREIGN PATENT DOCUMENTS

| | | |
|---|---|---|
| JP | 2007011612 A | 1/2007 |
| KR | 1020030064689 A | 8/2003 |
| KR | 1020050111222 A | 11/2005 |

OTHER PUBLICATIONS

Communication dated Feb. 16, 2015 by the International Searching Authority in related Application No. PCT/KR2014/012013, (PCT/ISA/210 &PCT/ISA/237).

*Primary Examiner* — Xi Wang
(74) *Attorney, Agent, or Firm* — Sughrue Mion, PLLC

(57) ABSTRACT

A digital photographing apparatus capable of reconfiguring an image signal processor (ISP), a method of controlling the digital photographing apparatus, and a system for controlling the digital photographing apparatus. The method includes: receiving a selection of at least one image signal processing module that is to be installed in the ISP; downloading the selected at least one image signal processing module from an external system; and reconfiguring the ISP by using the downloaded at least one image signal processing module.

20 Claims, 17 Drawing Sheets

(56) References Cited

U.S. PATENT DOCUMENTS

| | | | |
|---|---|---|---|
| 7,231,059 B1* | 6/2007 | Miyake | G06T 1/0021 |
| | | | 382/100 |
| 8,225,312 B2 | 7/2012 | DiCarlo et al. | |
| 9,081,798 B1* | 7/2015 | Wong | G06F 17/30247 |
| 2004/0257462 A1* | 12/2004 | Goris | H04N 5/232 |
| | | | 348/372 |
| 2005/0154787 A1 | 7/2005 | Cochran et al. | |
| 2011/0093580 A1* | 4/2011 | Nagasaka | G06F 8/60 |
| | | | 709/223 |
| 2011/0159962 A1 | 6/2011 | Yerli | |
| 2011/0181686 A1* | 7/2011 | Jeong | H04N 7/147 |
| | | | 348/14.08 |
| 2012/0229654 A1* | 9/2012 | Solomon | H04N 5/23225 |
| | | | 348/207.1 |
| 2013/0013687 A1* | 1/2013 | Liu | H04W 8/005 |
| | | | 709/204 |
| 2013/0325892 A1* | 12/2013 | Edwards | G06F 17/30864 |
| | | | 707/769 |
| 2016/0080587 A1* | 3/2016 | Ando | H04N 1/00244 |
| | | | 358/1.15 |

\* cited by examiner

DIGITAL PHOTOGRAPHING APPARATUS CAPABLE OF RECONFIGURING IMAGE SIGNAL PROCESSOR AND METHOD OF CONTROLLING THE SAME

RELATED APPLICATIONS

This application claims priority from Korean Patent Application No. 10-2013-0152647, filed on Dec. 9, 2013, and Korean Patent Application No. 10-2014-0106229, filed on Aug. 14, 2014, in the Korean Intellectual Property Office, the disclosure of which is incorporated herein in its entirety by reference.

BACKGROUND

1. Field

One or more aspects of exemplary embodiments relate to a digital photographing apparatus capable of reconfiguring an image signal processor (ISP), a method of controlling the digital photographing apparatus, and a system for controlling the digital photographing apparatus.

2. Description of Related Art

Developments in digital photographing apparatuses have made it possible to capture and process high quality, high definition images. Thus, the digital photographing apparatuses require an image signal processor (ISP) in which diverse functioning modules may be mounted.

However, in general, there are many restrictions to the type and number of modules that may be mounted in ISPs, especially in terms of performance and cost. For example, the more modules included in ISPs, the greater the volume thereof, whereas a processing speed thereof may be lowered. Also, the more modules included in ISPs, the higher the cost.

SUMMARY

One or more embodiments include a digital photographing apparatus capable of reconfiguring an image signal processor (ISP) by selectively downloading image signal processing modules desired by users, thereby achieving a lightweight digital photographing apparatus and increasing a processing speed, and a method of controlling the digital photographing apparatus.

One or more embodiments include a digital photographing apparatus that enables a user to conveniently download a driver of a hardware module exchanged by using a cloud server, and a method of controlling the digital photographing apparatus.

One or more embodiments include a digital photographing apparatus capable of downloading optimized software from a cloud server and installing the optimized software in exchanged hardware module, and a method of controlling the digital photographing apparatus.

Additional aspects will be set forth in part in the description which follows and, in part, will be apparent from the description, or may be learned by practice of the presented embodiments.

According to one or more embodiments, a method of controlling a digital photographing apparatus capable of reconfiguring an image signal processor (ISP) includes receiving a selection of at least one image signal processing module that is to be installed in the ISP, downloading the selected at least one image signal processing module from an external system, and reconfiguring the ISP by using the downloaded at least one image signal processing module.

The receiving of the selection may include receiving a list of image signal processing modules stored in the external system, and receiving a selection of at least one image signal processing module from among the received list of image signal processing modules.

The receiving of the selection may include transmitting information regarding the digital photographing apparatus to the external system, searching the external system for one or more image signal processing modules corresponding to the information regarding the digital photographing apparatus, and receiving a list of found image signal processing modules from the external system.

The list of image signal processing modules may include capacity and download count information for each of the image signal processing modules included in the list.

The receiving of the list may include receiving a list of open source image signal processing modules.

The method may further include performing an image processing operation using the downloaded at least one image signal processing module, and the reconfigured ISP may perform the image processing operation.

The external system may be one of a market server providing an online market capable of transacting the at least one image signal processing module, a cloud server connected to the digital photographing apparatus, and another digital photographing apparatus.

The method may further include performing an image processing operation using the downloaded at least one image signal processing module, and the external system may be a cloud server connected to the digital photographing apparatus, and the cloud server performs the image processing operation.

The performing of the image processing operation may further include uploading image data and environmental information to the cloud server.

The receiving of the selection may include receiving a list of image signal processing modules stored in a second digital photographing apparatus through a cloud server, and receiving a selection of at least one image signal processing module from among the received list of image signal processing modules.

The method may further include upgrading the ISP by exchanging hardware modules included in the ISP.

According to an aspect of an exemplary embodiment, a digital photographing apparatus may include an image signal processor (ISP) configured to perform an image processing operation corresponding to a predetermined image signal processing module, a selector configured to receive a selection of at least one image signal processing module that is to be installed in the ISP, a download controller configured to control the selected at least one image signal processing module to be downloaded from an external system, and a reconfigurer to reconfigure the ISP by using the downloaded at least one image signal processing module.

The selector may be further configured to receive a list including information regarding image signal processing modules registered in the external system, and receive a selection of at least one image signal processing module from among the received list of image signal processing modules.

The digital photographing apparatus may further include a communicator configured to transmit information regarding the digital photographing apparatus to the external system, and the selector may be further configured to receive a list of image signal processing modules corresponding to the information regarding the digital photographing apparatus.

The information regarding the image signal processing modules may include capacity and download count for each of the image signal processing modules.

The selector may be further configured to receive a list of open source image signal processing modules.

The digital photographing apparatus may further include a reconfigured ISP configured to perform an image processing operation using the downloaded at least one image signal processing module.

The external system may be one of a market server configured to provide an online market capable of transacting the at least one image signal processing module, a cloud server connected to the digital photographing apparatus, and a second digital photographing apparatus.

The ISP may be upgraded by exchanging hardware modules included in the ISP.

According to an aspect of an exemplary embodiment, a system for controlling a digital photographing apparatus, may include a digital photographing apparatus and a server configured to provide a plurality of image signal processing modules to the digital photographing apparatus. The digital photographing apparatus may include an image signal processor (ISP) configured to perform an image processing operation corresponding to a predetermined image signal processing module, a selector configured to receive a selection of at least one image signal processing module that is to be installed in the ISP, a download controller configured to control the selected at least one image signal processing module to be downloaded from an external system, and a reconfigurer configured to reconfigure the ISP by using the downloaded at least one image signal processing module.

The server may include a server image signal processor configured to allow the server to perform an image processing operation of the at least one image signal processing module downloaded by the digital photographing apparatus.

The image signal processor may be configured to upload to the server image data on which the image processing operation is to be performed and environmental information of a place where the digital photographing apparatus is located.

According to an aspect of an exemplary embodiment, a method of controlling a digital photographing apparatus of which hardware modules are exchangeable may include acquiring information regarding exchanged hardware modules, providing a list of a plurality of drivers related to the exchanged hardware modules based on the information regarding the exchanged hardware modules, downloading a driver selected from the provided list from an external system, and reconfiguring the exchanged hardware modules by using the downloaded driver.

The functions available from the exchanged hardware modules may be different according to each of the plurality of drivers provided from the list.

The method may further include providing an application list related to the exchanged hardware modules installed in the digital photographing apparatus, and downloading and installing an application selected from the application list based on a user input.

According to an aspect of an exemplary embodiment, an apparatus for controlling a digital photographing apparatus of which hardware modules are exchangeable may include a hardware module information acquirer configured to acquire information regarding exchanged hardware modules, a selector configured to provide a list of a plurality of drivers related to the exchanged hardware modules based on the information regarding the exchanged hardware modules, a download controller configured to control a driver selected from the provided list to be downloaded from an external system, and a reconfigurer configured to reconfigure the exchanged hardware modules by using the downloaded driver.

The selector may be configured to provide an application list related to the exchanged hardware modules among applications installed in the digital photographing apparatus, and the download controller may be configured to control an application selected from the application list to be downloaded and installed based on a user input.

According to an aspect of an exemplary embodiment, a method of providing software for an electronic apparatus may include detecting a hardware module, searching a software database for one or more programs that correspond to the detected hardware module, and installing one or more of the programs that correspond to the detected hardware module.

The searching may include displaying a list of the one or more programs from the software database that correspond to the detected hardware, and receiving an input corresponding to one or more programs from the displayed list. The one or more programs that are installed may correspond to the received input.

The installing may include downloading the one or more programs that correspond to the received input from an external device.

According to an aspect of an exemplary embodiment, an electronic apparatus may include an exchangeable component receptor configured to allow a component to be installed in the electronic apparatus, a component detector configured to detect one or more installed components, a communicator configured to communicate with an external system, and a reconfigurer configured to reconfigure the one or more installed components based on a program received from the external system via the communicator.

The electronic apparatus may further include a display configured to display a list of programs available on the external system, and an operator configured to receive an input from a user. If the operator receives a selection input, the communicator may download a corresponding program from the external system.

BRIEF DESCRIPTION OF THE DRAWINGS

These and/or other aspects will become apparent and more readily appreciated from the following description of the embodiments, taken in conjunction with the accompanying drawings in which.

DETAILED DESCRIPTION

Figure 1:
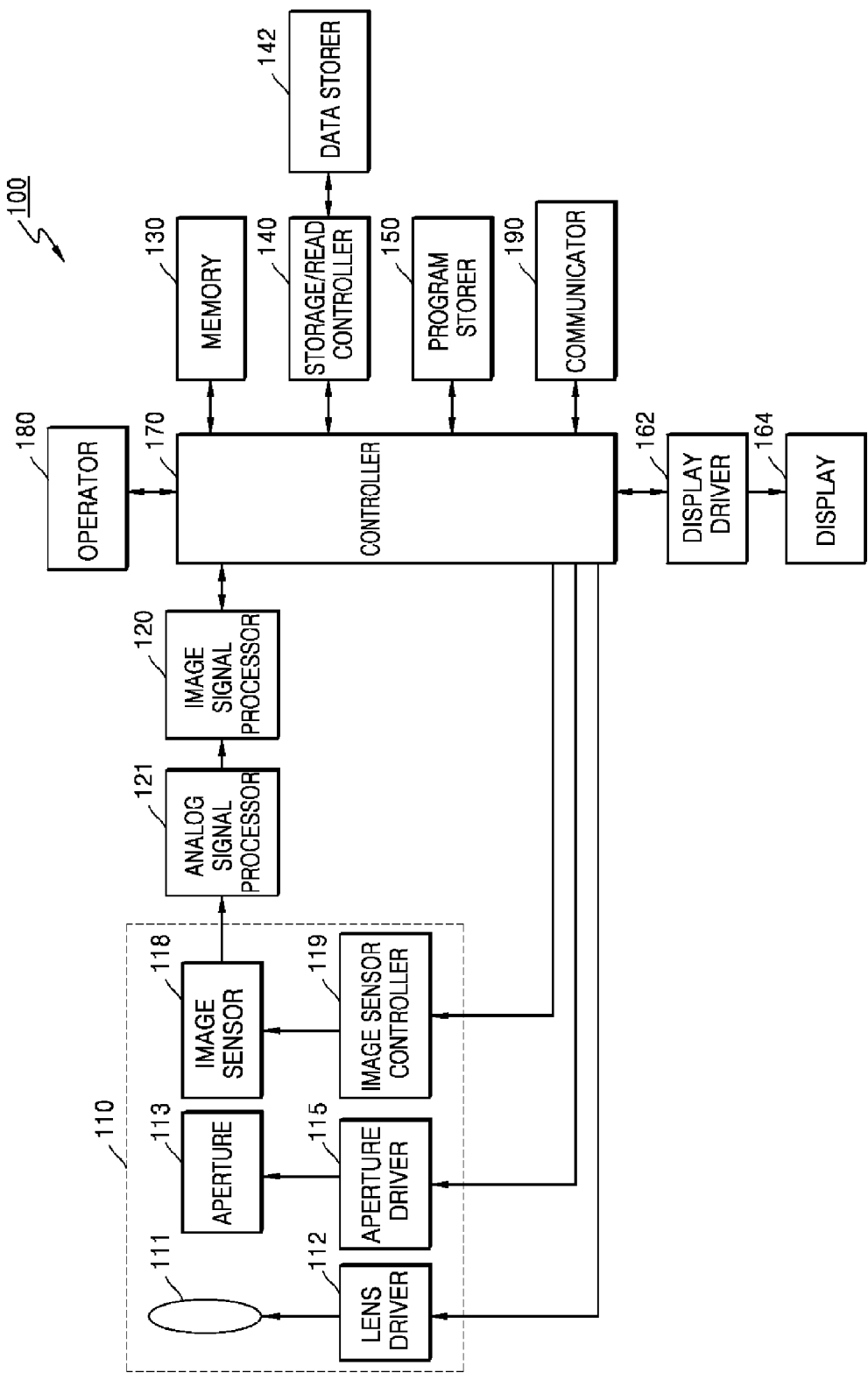
FIG. 1 is a block diagram illustrating a structure of a digital photographing apparatus according to an aspect of an exemplary embodiment.

The following detailed description is provided to assist the reader in gaining a comprehensive understanding of the methods, apparatuses, and/or systems described herein. However, various changes, modifications, and equivalents of the methods, apparatuses and/or systems described herein will be apparent to one of ordinary skill in the art.

All terms including descriptive or technical terms used herein should be construed as having meanings that are apparent to one of ordinary skill in the art. However, the terms may have different meanings according to an intention of one of ordinary skill in the art, precedent cases, or the appearance of new technologies. Also, some terms may be arbitrarily selected by the applicant, and in this case, the meaning of the selected terms will be described in detail in the detailed description of the disclosure. Thus, the terms used herein have to be defined based on the meaning of the terms together with the description throughout the specification.

When a part "includes" or "comprises" an element, unless there is a particular description contrary thereto, the part can further include other elements, not excluding the other elements.

The present disclosure may be described in terms of functional block components and various processing steps. Such functional blocks may be realized by any number of hardware and/or software components configured to perform the specified functions. For example, the present disclosure may employ various integrated circuit components, e.g., memory elements, processing elements, logic elements, look-up tables, and the like, which may carry out a variety of functions under the control of one or more microprocessors or other control devices. Similarly, where the elements are implemented using software programming or software elements, the disclosure may be implemented with any programming or scripting language such as C, C++, Java, assembler, or the like, with the various algorithms being implemented with any combination of data structures, objects, processes, routines or other programming elements. Functional aspects may be implemented in algorithms that are executed by on one or more processors. Furthermore, the present disclosure could employ any number of conventional techniques for electronics configuration, signal processing and/or control, data processing and the like. The words "mechanism" and "element" are used broadly and are not limited to mechanical or physical embodiments, but can include software routines in conjunction with processors, etc.

The particular implementations shown and described herein are illustrative examples and are not intended to otherwise limit the scope of the disclosure in any way. For the sake of brevity, conventional electronics, control systems, software development and other functional aspects of the systems (and components of the individual operating components of the systems) may not be described in detail. Furthermore, the connecting lines, or connectors shown in the various figures presented are intended to represent exemplary functional relationships and/or physical or logical couplings between the various elements. It should be noted that many alternative or additional functional relationships, physical connections or logical connections may be present in a practical device. Moreover, no item or component is essential to the practice of the disclosure unless the element is specifically described as "essential" or "critical".

The steps of all methods described herein can be performed in any suitable order unless otherwise indicated herein or otherwise clearly contradicted by context. The use of any and all examples, or exemplary language (e.g., "such as") provided herein, is intended merely to better illuminate the disclosure and does not pose a limitation on the scope of the disclosure unless otherwise claimed.

The use of the terms "a" and "an" and "the" and similar referents in the context of describing the disclosure (especially in the context of the following claims) are to be construed to cover both the singular and the plural. Furthermore, recitation of ranges of values herein are intended to refer individually to each separate value falling within the range, unless otherwise indicated herein, and each separate value is incorporated into the specification as if it were individually recited herein.

As used herein, the term "an embodiment" or "embodiment" refers to properties, structures, features, and the like, that are described in relation to an embodiment that is included in at least one embodiment. Thus, expressions such as "according to an embodiment" and "according to an aspect of an exemplary embodiment" do not always refer to the same embodiment.

The terms "communication", "communication network", and "network" may be considered to have substantially the same meaning. The above three terms include wired and wireless, near distance and wide area data transmission and reception networks, and may be used between two or more of an image signal processor module, a digital photographing apparatus for capturing an image file, a server, a personal computer (PC), a mobile terminal, and the like.

The term "market server" refers to a server computer configured to provide an online market to transact software modules, such as the image signal processor module. In this regard, the online market refers to an online space where platforms and service infrastructure based software modules that are developed and are open-source developed by developers are available. The market server may be connected to middleware for databases or servers for payment processing, descriptions of which will be omitted in the present disclosure.

The term "cloud server" means a server computer that a client accesses to receive a cloud computing service (hereinafter referred to as a "cloud service"). In this regard, the cloud service means a computer environment in which information is permanently stored in a server via the Internet and is temporarily stored in a client which is an information technology (IT) device, such as a digital photographing device, a tablet PC, a computer, a laptop computer, a net book, a smart phone, etc. That is, the cloud service is a concept of storing information regarding a user in a server via the Internet and using the information via various IT devices regardless of time and location. In other words, the cloud service means a computing service whereby users can borrow desired computing resources having an intangible form like a cloud (e.g., hardware/software resources) by paying fees therefor, i.e., technology whereby computing resources present at physically different locations are integrated and provided through virtualization technology.

A "digital photographing apparatus" according to an embodiment may include not only a digital single-lens reflex (DSLR) and a mirrorless camera but also an apparatus embedded with a camera module including a lens and a capturing device, capturing a subject, and generating an image such as a smartphone or a wearable device.

One or more exemplary embodiments of the present disclosure will now be described more fully with reference to the accompanying drawings. However, the one or more exemplary embodiments of the present disclosure may be embodied in many different forms, and should not be construed as being limited to the exemplary embodiments set forth herein. Rather, these exemplary embodiments are provided so that this disclosure will be thorough and complete, and will fully convey the concept of the one or more exemplary embodiments of the present disclosure to those of ordinary skill in the art. In the following description, well-known functions or constructions are not described in detail because the well-known functions would obscure the one or more exemplary embodiments of the present disclosure with unnecessary detail. Like reference numerals in the drawings denote like or similar elements throughout the specification.

FIG. 1 is a block diagram illustrating a digital photographing apparatus 100 capable of reconfiguring an image signal processor (ISP) 120, according to an aspect of an exemplary embodiment.

The digital photographing apparatus 100 includes a capturer 110, the ISP 120, an analog signal processor 121, a memory 130, a storage read controller 140, a data storer 142, a program storer 150, a display driver 162, a display 164, a controller 170, an operator 180, and a communicator 190.

The controller 170 controls the overall operation of the digital photographing apparatus 100. The controller 170 provides control signals for operating elements such as a lens driver 112, an aperture driver 115, and an image sensor controller 119.

The capturer 110 is an element for generating electric image signals from incident light. The capturer 110 includes a lens 111, the lens driver 112, an aperture 113, the aperture driver 115, an image sensor 118, and the image sensor controller 119.

The lens 111 may include a plurality of groups of lenses or a plurality of lenses. A position of the lens 111 is controlled by the lens driver 112. The lens driver 112 controls the position of the lens 111 according to control signals from the controller 170.

The aperture 113 may be adjusted to control an amount of light incident on the image sensor 118. The aperture driver 115 controls the degree of opening of the aperture 113.

Optical signals having passed through the lens 111 and the aperture 113 form an image of a subject on a light-receiving surface of the image sensor 118. The image sensor 118 may convert optical signals into electric signals, and may be a charge-coupled device (CCD) image sensor or a complementary metal-oxide semiconductor (CIS) image sensor. A sensitivity of the image sensor 118 may be controlled by the image sensor controller 119. The image sensor controller 119 may control the imaging device 118 in real time according to control signals that are automatically generated in response to input image signals, or manually input by a user.

The analog signal processor 121 may perform noise reduction processing, gain adjustment, waveform shaping, analog-to-digital conversion, or the like on analog signals that are supplied by the image sensor 118.

The ISP 120 is a signal processor that may perform special function processing on image data signals processed by the analog signal processor 121. The ISP 120 may reduce noise of input image data, and may perform image signal processing in order to improve image quality. Such processing may include gamma correction, color filter array interpolation, color matrix, color correction, color enhancement, white balancing, brightness smoothing, color shading, etc. The ISP 120 may provide special effect processing on image data signals. The ISP 120 may also compress the input image data in order to generate an image file, or restore the image data from the image file. A compression format of the image data may be reversible or irreversible. Examples of the compression format for still images include the Joint Photographic Experts Group (JPEG) format, or the JPEG 2000 format. When capturing moving images, a moving image file may be generated by compressing a plurality of frames according to, for example, a Moving Picture Experts Group (MPEG) standard. The image file may be generated according to an Exchangeable image file format (Exif) standard.

The ISP 120 may generate a moving image file from imaging signals generated by the image sensor 118. The imaging signals may be generated by the image sensor 118 and processed by the analog signal processor 121. The ISP 120 may generate frames to be included in the moving image file from the imaging signals, code the frames according to a standard such as MPEG4, H.264/AVC, or windows media video (WMV), and compress the frames so as to generate the moving image file. The moving image file may be generated in various formats such as mpg, mp4, 3gpp, avi, asf, or mov.

The image data that is output from the ISP 120 is input to the storage read controller 140 directly, or via the memory 130. The storage read controller 140 may store the image data in the data storer 142 automatically, or according to a signal input from the user. The storage read controller 140 may read the image data from the image file stored in the data storer 142, and provide the image data to the display driver 162 via the memory 130 or another path, so as to display the image on the display 164. The data storer 142 may be a separable component, or a built-in component of the digital photographing apparatus 100.

The ISP 120 may also perform obscuring, coloring, blurring, edge enhancement, image analysis processing, image recognition processing, image effect processing, and the like on the input image data. The image recognition processing may be a face recognition process, a scene detection process, or the like. Furthermore, the ISP 120 may process image signals to be displayed on the display 164. For example, brightness level adjustment, color correction, contrast adjustment, contour enhancement, screen division, character image generation, and image combination may be performed.

The ISP 120, according to an aspect of an exemplary embodiment, may be implemented as an application specific instruction processor (ASIP) that may be reconfigured by an image signal processing module. The image signal processing module may be downloaded, and may enable the ISP 120 to perform a diverse array of additional functions. The ISP 120 is not limited to the above-described configuration, and it will be understood by those of ordinary skill in the art that the ISP 120 may be implemented as a different type of hardware capable of being reconfigured in accordance with a downloaded image signal processing module.

The ISP 120, according to an aspect of an exemplary embodiment, may be upgraded. That is, the ISP 120 may be upgraded by installing an image signal processing module in a physical hardware computing module. Thus, performance of the ISP 120 may be upgraded by exchanging physical hardware modules. For example, hardware modules included in the ISP 120 may be upgraded by exchanging, for example, a central processing unit (CPU) or a random access memory (RAM).

Various image signal processing modules may be installed in the ISP 120 according to types of hardware modules included in the ISP 120. Thus, at least one of hardware modules included in the ISP 120 may be exchanged, and new image processing functions may be performed.

The signals processed by the ISP 120 may be input to the controller 170 directly, or via the memory 130. The memory 130 may function as a main memory of the digital photographing apparatus 100, and may temporarily store information required for operation of the ISP 120 or the controller 170. The program storer 150 may store one or more programs for operating the digital photographing apparatus 100, such as an operation system, an application system, and the like.

In addition, the digital photographing apparatus 100 includes display 164 for displaying an operation status or information regarding an image captured by the digital photographing apparatus 100. The display 164 may provide visual information to the user. The display 164 may include, for example, a liquid crystal display (LCD) panel, an organic light-emitting display panel, or the like, in order to provide visual information. The display 164 may also include a touch screen configured to detect one or more touch inputs.

The display driver 162 provides driving signals to the display 164.

The controller 170 may process input image signals and control each element according to the input image signals or external input signals. The controller 170 may include one or more processors. A processor may be implemented by an array of multiple logic gates, or as a combination of a general-purpose micro-processor and memory storing a program that may be executed by the micro-processor. It will be understood by those of ordinary skill in the art that the processor may be implemented by any one of various types of hardware.

The controller 170 may execute the programs stored in the program storer 150. The controller 170 may include a separate module for generating control signals for auto focusing, zoom ratio adjusting, focus shifting, auto exposure correction, and the like. The controller 170 may provide corresponding control signals to the aperture driver 115, the lens driver 112, and the image sensor controller 119. Thus, the controller 170 may control one or more components of the digital photographing apparatus 100, such as the shutter, a strobe, and the like.

According to an aspect of an exemplary embodiment, the controller 170 may be connected to an external monitor. The controller 170 may perform predetermined processing on the image signals input from the ISP 120 to be displayed on the external monitor, and transmit the processed image signals so that the processed image signals may be displayed on the external monitor.

The controller 170 may download an image signal processing module from an external system, and may control the ISP 120 to be reconfigured by using the downloaded image signal processing module. The external system may be a market server capable of transacting signal processing modules, a cloud server sharing signal processing modules, or another digital photographing apparatus.

The user may input control signals via the operator 180. The operator 180 may include various functional buttons, such as a shutter-release button for inputting shutter-release signals, a power button, for inputting power control signals, a zoom button for widening or narrowing an angle of view, a mode selection button for selecting a mode, and the like. The operator 180 may be implemented in any form that allows the user to input control signals, such as buttons, a keyboard, a touch pad, a touch screen, and a remote control.

A communicator 190 may include a network interface card (NIC) or a modem, and may allow the digital photographing apparatus 100 to communicate with the external system over a wired or wireless network.

Figure 2:
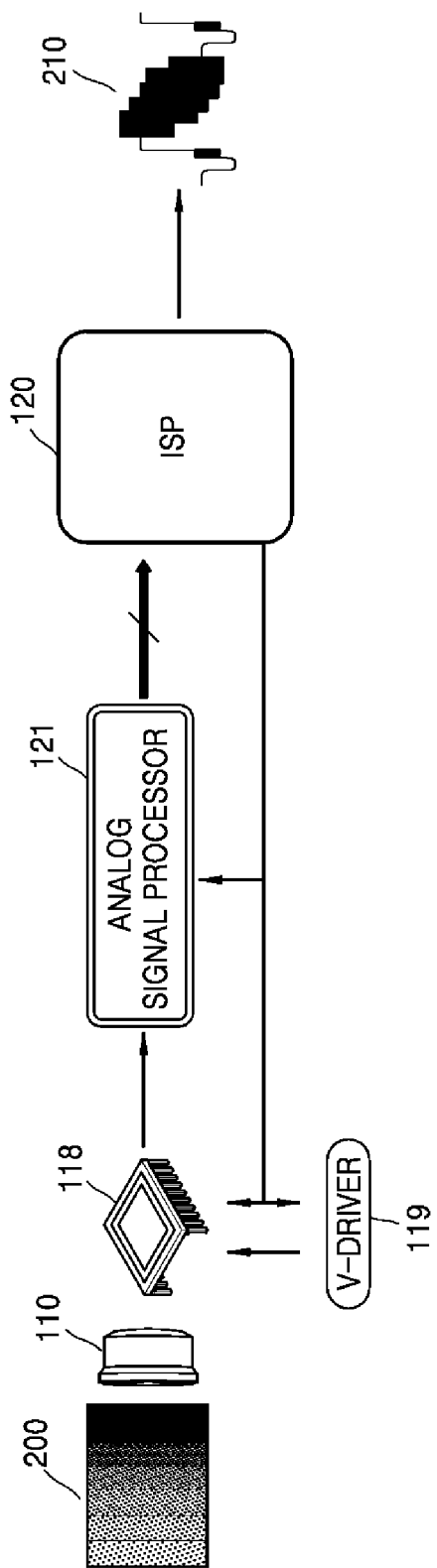
FIG. 2 is a diagram illustrating operation of an ISP according to an aspect of an exemplary embodiment.

FIG. 2 is a diagram for illustrating an operation of the ISP 120 according to an aspect of an exemplary embodiment.

As shown in FIG. 2, an image 200 input to the capturer 110 is converted into an electric signal by the image sensor 118. The converted signal is converted into a digital signal by the analog signal processor 121, and is then input to the ISP 120. The ISP 120 may perform one or more processes in order to generate image data 210, either as a compressed image file or a raw data format. In this regard, the image sensor controller 119 may provide a voltage drive for vertical signals of the image sensor 118, and timing pulses to control operation of the analog signal processor 121 and the ISP 120.

According to an aspect of an exemplary embodiment, the ISP 120, may include one or more of a plurality of modules for performing special function processing on the digital signal converted by the analog signal processor 121. An image signal processing module may improve image quality of the input image 200 and perform image signal processing in order to provide special effects. Exemplary image signal processing modules include a noise reduction module, a gamma correction module, a color filter, a color filter array interpolation module, a color matrix module, a color correction module, a color enhancement module, a white balancing module, a brightness smoothing module, an argument reality module, a shutter timer module, a histogram analysis module, a face recognition module, a color shading module, etc.

For example, the ISP 120 may remove a dark current black level generated in an image sensor sensitive to a temperature change. The ISP 120 may perform gamma correction that encodes information in accordance with non-linear characteristics of human sight. The ISP 120 may perform color filter array (CFA) interpolation that interpolates a Bayer pattern implemented as RGRG and GBGB lines of predetermined data on which gamma correction is performed as RGB lines. The ISP 120 may convert interpolated RGB signals into YUV signals, perform edge compensation, and remove noise of the U and Y signals. Edge compensation may be performed by filtering a Y signal by using a high pass filter and clearly processing an image and color correction to correct color values of the YUV signals by using a standard color coordinate system. The ISP 120 may process the YUV signals from which noise is removed and generate the image data 210. The image data 210 may be output in a raw data format or a compressed data format according to a predetermined compression standard (for example, JPEG).

The modules included in the ISP 120 are not limited to the above-mentioned modules, and specific operations thereof are well known, and thus detailed descriptions of the operations are omitted.

Operation of the above-described image signal processing modules may be different according to performance and effect of the image signal processing modules included in the ISP 120. That is, performance and processing speeds of the modules may be different according to manufacturers and specifications of the modules.

For example, a capacity and processing speed of the noise reduction module for processing noise compensation may differ according to algorithm and hardware performance. Cost investment with respect to one image signal processing module may also differ according to the performance of the image signal processing module. Furthermore, developments in technology may yield a higher performing noise reduction module.

Therefore, according to an aspect of an exemplary embodiment, the ISP 120 may be reconfigured by installation or deletion of at least one image signal processing module based on a user selection. For example, a module may be easily downloaded and installed or upgraded.

According to an aspect of an exemplary embodiment, the ISP 120 may be implemented as an application specific integrated circuit (ASIC). Thus, the ISP 120 may be configured to perform a diverse array of functions by installing an image signal processing software module in a flexible hardware module in an ASIC that is hardware and driving the image signal processing module to control a predetermined region of the ASIC. For example, the ISP 120 may be reconfigured in such a way that the ISP 120 is initially released as an image signal processing module for outputting live view image data. Later, at least one image signal processing module may be additionally installed according to a user selection (for example, an image signal processing module of a video codec for 3D image data processing may be installed to enable a region of the ISP 120 to perform 3D image data processing). Meanwhile, an operation of reconfiguring the ISP 120 by installing a predetermined image signal processing module may be controlled by the controller 170.

According to an aspect of an exemplary embodiment, the ISP 120 may also be upgraded. That is, the ISP 120 may be upgraded by installing an image signal processing module in a physical hardware module. Thus, performance of the ISP 120 may be upgraded by exchanging physical hardware modules. For example, hardware modules included in the ISP 120 may be exchanged in a manner similar to upgrading a CPU or RAM in a desktop PC.

Depending on the type of hardware modules included in the ISP 120, various image signal processing modules may be installed in the ISP 120. Thus, one or more of a plurality of hardware modules constituting the ISP 120 may be exchanged, and new image processing functions may be performed.

Furthermore, other hardware modules, such as the capturer 110, the ISP 120, the analog signal processor 121, the memory 130, the storage read controller 140, the data storer 142, the program storer 150, the display driver 162, the display 164, the controller 170, and the operator 180 included in the digital photographing apparatus 100 may be exchanged.

Figure 3:
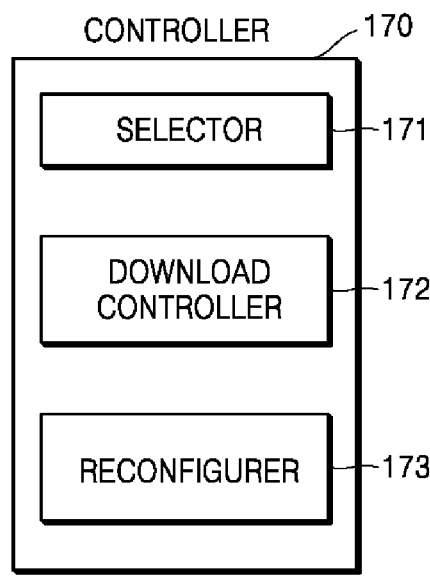
FIG. 3 is a block diagram illustrating a structure of a controller according to an aspect of an exemplary embodiment.

FIG. 3 is a block diagram illustrating a structure of the controller 170 according to an aspect of an exemplary embodiment.

As shown in FIG. 3, the controller 170 may include a selector 171 configured to receive a selection of at least one image signal processing module that is to be installed in the ISP 120. The controller 170 may further include a download controller 172 that controls the selected image signal processing module to be downloaded from an external system, and a reconfigurer 173 that reconfigures the ISP 120 by using the downloaded image signal processing module.

According to an aspect of an exemplary embodiment, the image signal processing module may include different types of modules that may improve image quality of the input image 200 and perform image signal processes for providing special effects, such as a noise reduction module, a gamma correction module, a color filter, a color filter array interpolation module, a color matrix module, a color correction module, a color enhancement module, a white balancing module, a brightness smoothing module, an argument reality module, a shutter timer module, a histogram analysis module, a face recognition module, a color shading module, etc.

Operation of the controller 170 according to an aspect of an exemplary embodiment is described in detail with reference to FIG. 4 below.

Figure 4:
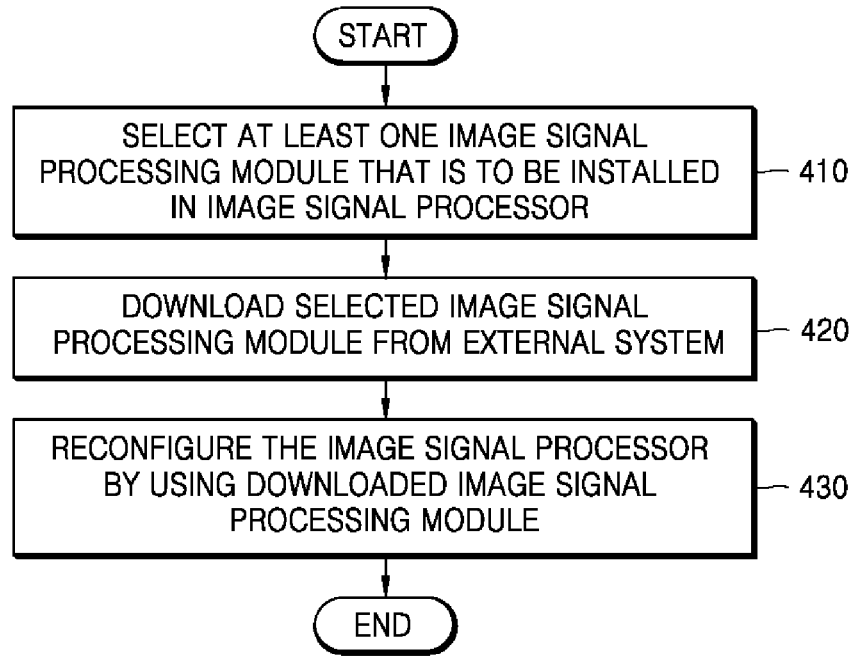
FIG. 4 is a flowchart illustrating a method of controlling a digital photographing apparatus according to an aspect of an exemplary embodiment.

FIG. 4 is a flowchart illustrating a method of controlling the digital photographing apparatus 100, according to an aspect of an exemplary embodiment. The method may be performed by the digital photographing apparatus 100 of FIG. 1. The digital photographing apparatus 100 of FIG. 4 may be controlled by the controller 170 in conjunction with various peripheral elements.

In operation 410, the selector 171 may receive a selection indicating at least one image signal processing module to be installed in the ISP 120. For example, a list of image signal processing modules may be displayed on the display 164. The list of image signal processing modules may be received from an external system. The external system may be a market server, a cloud server, or another digital photographing apparatus. For example, a list of image signal processing modules registered in an online market may be received by accessing the market server. Alternatively, if the external system is a cloud server, the list of image signal processing modules may be received from the cloud server, and if the external system is another digital photographing apparatus, the list of image signal processing modules may be received from the other digital photographing apparatus.

The selector 171 may receive a selection of at least one image signal processing module from among a received list of image signal processing modules, based on a user input. Additionally, an updated version of an image signal processing module previously installed in the digital photographing apparatus 100 may be selected via the selector 171.

Figure 5:
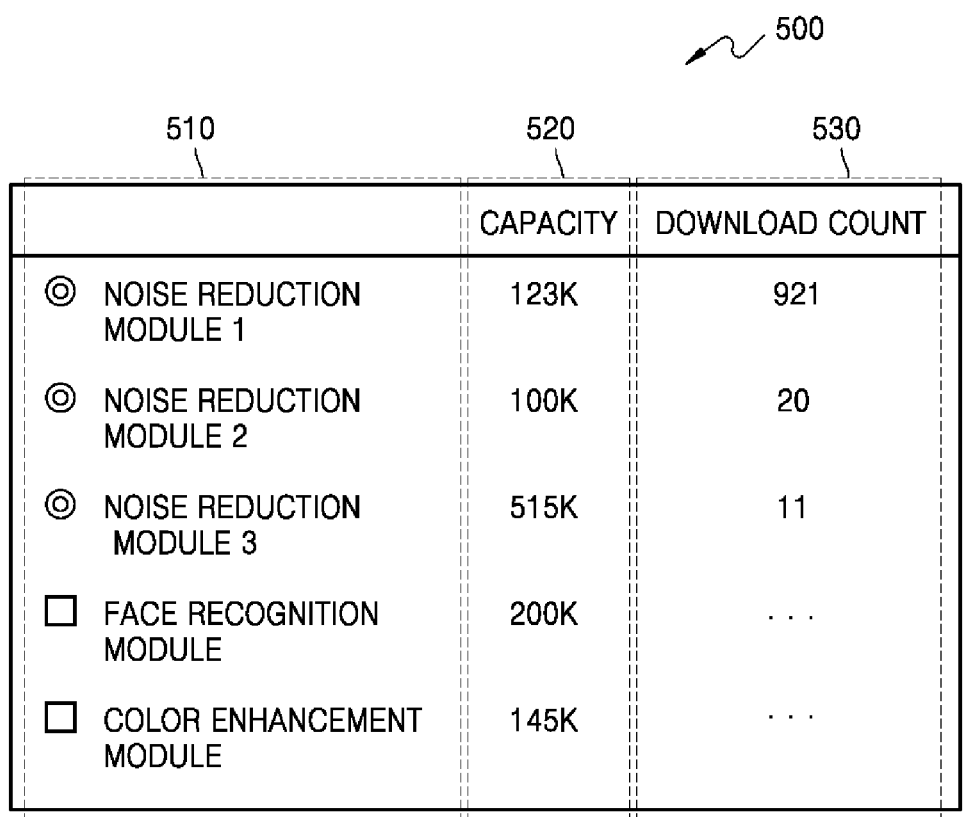
FIG. 5 is a table of image signal processing modules displayed on a display according to an aspect of an exemplary embodiment.

FIG. 5 is a table 500 of image signal processing modules displayed on the display 164, according to an aspect of an exemplary embodiment.

The list 500 may include names 510 of the image signal processing modules, a capacity 520, a download count 530, etc. As one having ordinary skill in the art would appreciate, the list 500 is not limited to the above-described configuration, and additional information about the image signal processing modules such as manufacturers, user evaluation scores, and additional explanations, may also be displayed.

For example, the list 500 may further include a purchase price that is paid when a corresponding image signal processing module is downloaded.

According to an aspect of an exemplary embodiment, a list of image signal processing modules installed in another digital photographing apparatus may be received. The list of the image signal processing modules may further include a name of the other digital photographing apparatus and a distance between the digital photographing apparatus 100 and the other digital photographing apparatus.

As shown in FIG. 4, the download controller 172, according to an aspect of an exemplary embodiment, may control the selected image signal processing module to be downloaded from the external system in operation 420. For example, a selected image signal processing module registered in an online market may be received by accessing the market server. As another example, image signal processing modules registered on a cloud server may be received by accessing the cloud server. As another example, image signal processing modules installed in another digital photographing apparatus may be downloaded by accessing the other digital photographing apparatus.

In operation 430, the reconfigurer 173 may reconfigure the ISP 120 by using the downloaded image signal processing module. Reconfiguration of the ISP 120 with a downloaded image signal processing module was described above with reference to FIG. 2, and thus a description thereof will not be repeated here.

A detailed method of controlling a digital photographing apparatus according to an aspect of an exemplary embodiment will now be described with reference to FIGS. 6 through 12 below.

Figure 6:
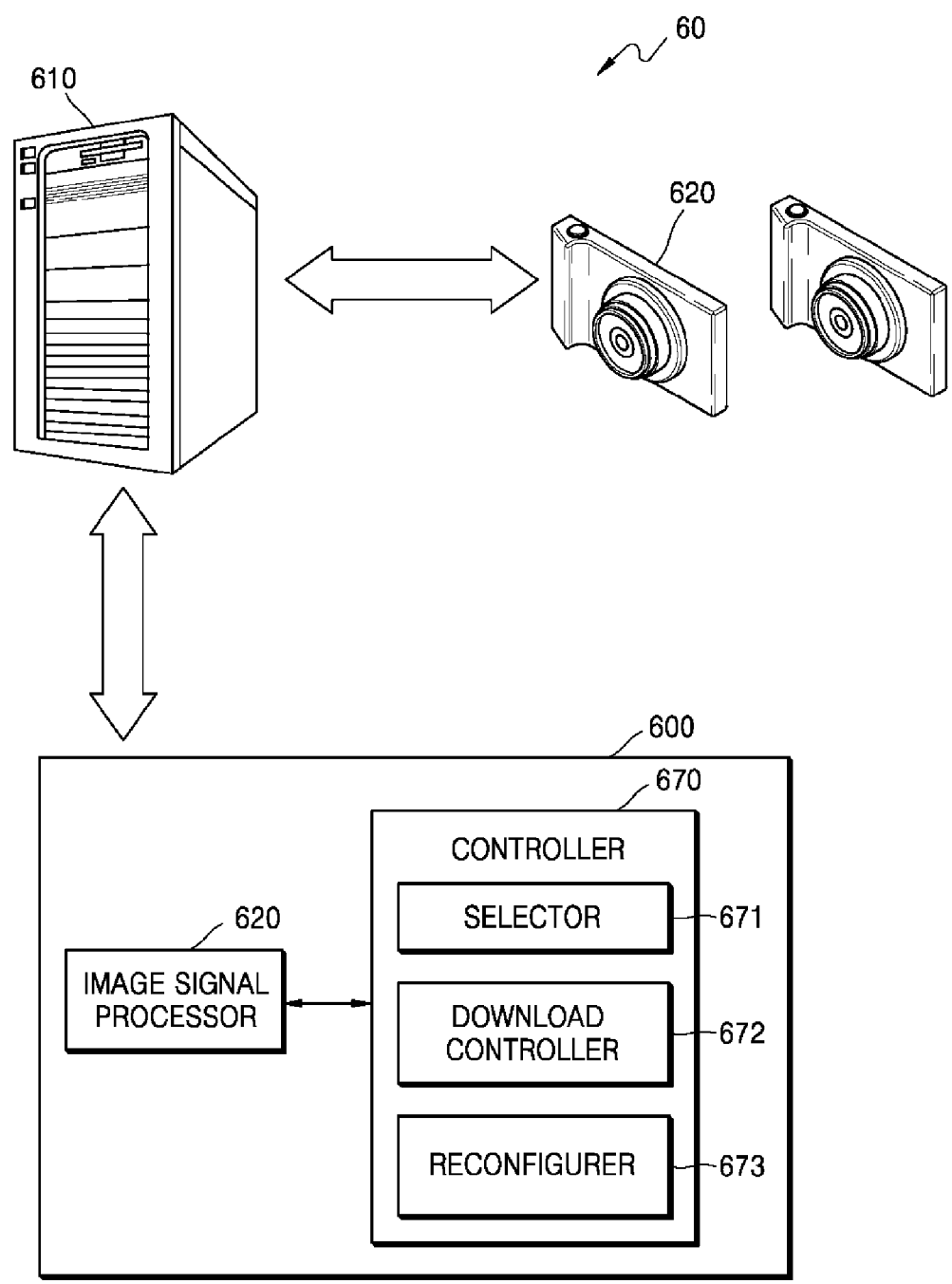
FIG. 6 is a diagram illustrating a system for controlling a digital photographing apparatus according to an aspect of an exemplary embodiment.

FIG. 6 illustrates a system 60 for controlling a digital photographing apparatus 600, according to an embodiment.

As shown in FIG. 6, the digital photographing apparatus 600 may include an ISP 620 and a controller 670. The controller 670 may further include a selector 671, a download controller 672, and a reconfigurer 673.

The digital photographing apparatus 600 may reconfigure the ISP 620 by installing at least one image signal processing module downloaded from a server 610.

Figure 8:
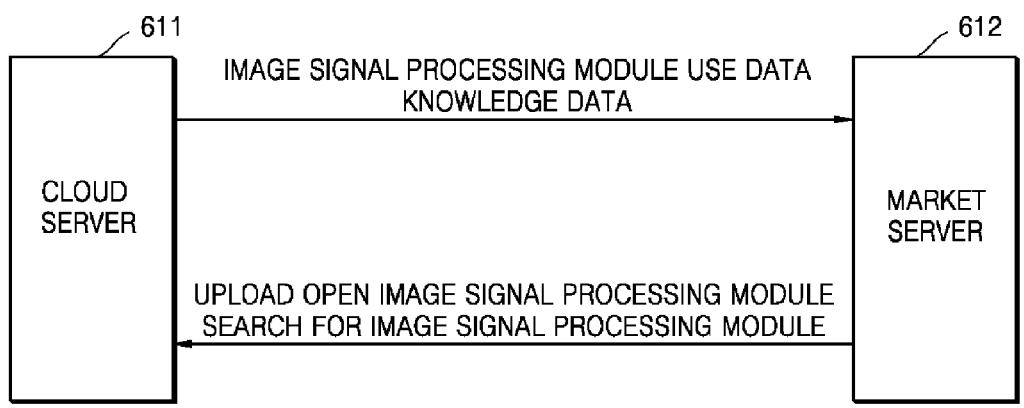
FIG. 8 is a block flow diagram illustrating an operation of controlling a server for controlling a digital photographing apparatus, according to an aspect of an exemplary embodiment.

The server 610 may be a market server that provides an online market capable of transacting image signal processing modules, or a cloud server that provides a cloud service to the digital photographing apparatus 600. Thus, the digital photographing apparatus 600 may download image signal processing modules stored in the market server or image signal processing modules stored in the cloud server via the market server as shown in FIG. 8.

The digital photographing apparatus 600 may include a basic image signal processing module for capturing and reproducing images. Thereafter, a user may download a desired image signal processing module from the online market and the downloaded image signal processing module may be installed in the ISP 620. That is, the ISP 620 may be reconfigured by installing the image signal processing module downloaded from the online market in the digital photographing apparatus 600.

A user of the digital photographing apparatus 600 may upload an open source image signal processing module to the online market. In this regard, the open source image signal processing module refers to an image signal processing module developed or modified by individuals.

That is, image signal processing modules may be transacted by advertising an open source image signal processing module developed by individual users of the digital photographing apparatus 600. This allows a user of another digital photographing apparatus 620 to purchase the open source image signal processing module, thereby creating a new profit model.

Meanwhile, a 3rd generation (3G) or 4th generation (4G) communication network may be used to transmit and receive image signal processing module data.

Figure 7:
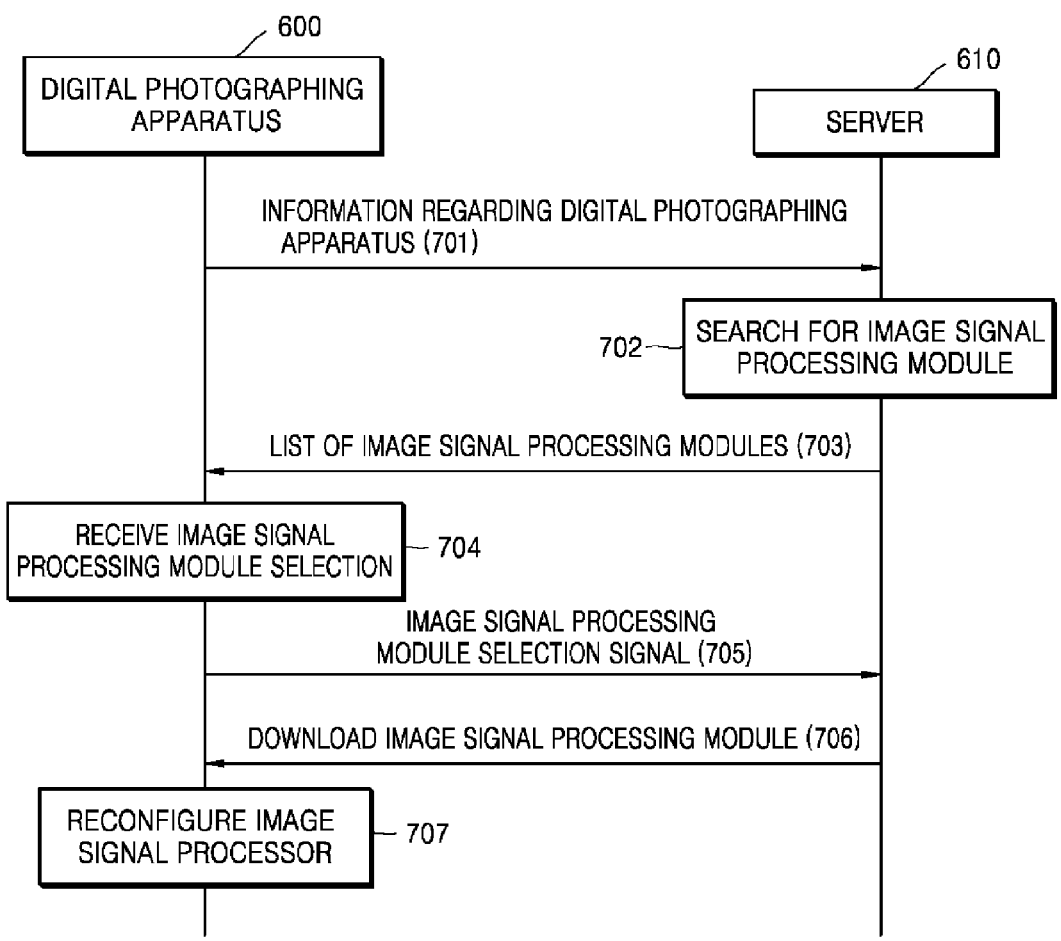
FIG. 7 is a block flow diagram illustrating an operation of a digital photographing apparatus according to an aspect of an exemplary embodiment.

FIG. 7 is a block flow diagram illustrating an operation of the digital photographing apparatus 600 according to an aspect of an exemplary embodiment.

In operation 701, the digital photographing apparatus 600 may provide information about the digital photographing apparatus 600 to the server 610. The information may include a configuration of the ISP 620, performance, available capacity, and a type of the digital photographing apparatus 600. According to an aspect of an exemplary embodiment, the information may further include a search term input by a user.

In operation 702, the server 610 may search a database for image signal processing modules corresponding to the information provided by the digital photographing apparatus 600. In operation 703, the server 610 may provide a list of one or more image signal processing module search results to the digital photographing apparatus 600. According to an aspect of an exemplary embodiment, only image signal processing modules that are compatible with the ISP 620 of the requesting digital photographing apparatus 600 are included in the list of image signal processing modules. According to an aspect of an exemplary embodiment, the list of image signal processing modules may include only image signal processing modules corresponding to the search term input by the user. The list of image signal processing modules may include names of image signal processing modules, capacity, download count, etc.

In operation 704, the digital photographing apparatus 600 receives the list of image signal processing modules, the selector 671 may receive a selection of at least one image signal processing module from among the one or more image signal processing modules included in the list. The selection may be made according to a selection signal input by the user. Alternatively, a selection signal may be generated by the controller 670 to update an image signal processing modules installed in the ISP 620.

In operation 705, the server 610 receives the selection signal of the image signal processing module. In operation 706, the download controller 672 may control the digital photographing apparatus 600 to download a selected image signal processing module.

In operation 707, the reconfigurer 673 may reconfigure the ISP 620 by using the downloaded image signal processing module.

The reconfigured ISP 620 may perform image processing using the downloaded image signal processing module.

FIG. 8 is a block flow diagram illustrating an operation of the server 610 included in the system 60 for controlling the digital photographing apparatus 600, according to an aspect of an exemplary embodiment.

The server 610 may be a market server 612 that provides an online market capable of transacting image signal processing modules, or a cloud server 611 that provides a cloud service to the digital photographing apparatus 600. Thus, image signal processing modules stored in the cloud server 611 may be downloaded via the market server 612 as shown in FIG. 8.

The cloud server 611 may transmit information, including a list of the stored image signal processing modules, capacity, a total download count, etc. to the market server 612, to allow the online market to provide the list of the image signal processing modules to a user. The cloud server 611 may also transmit a knowledge database necessary for a computer to see the market server 612.

The market server 612 may search for the image signal processing modules of the cloud server 611 to allow the user to upload open source image signal processing modules that are uploaded on the online market or the cloud server 611.

Figure 9:
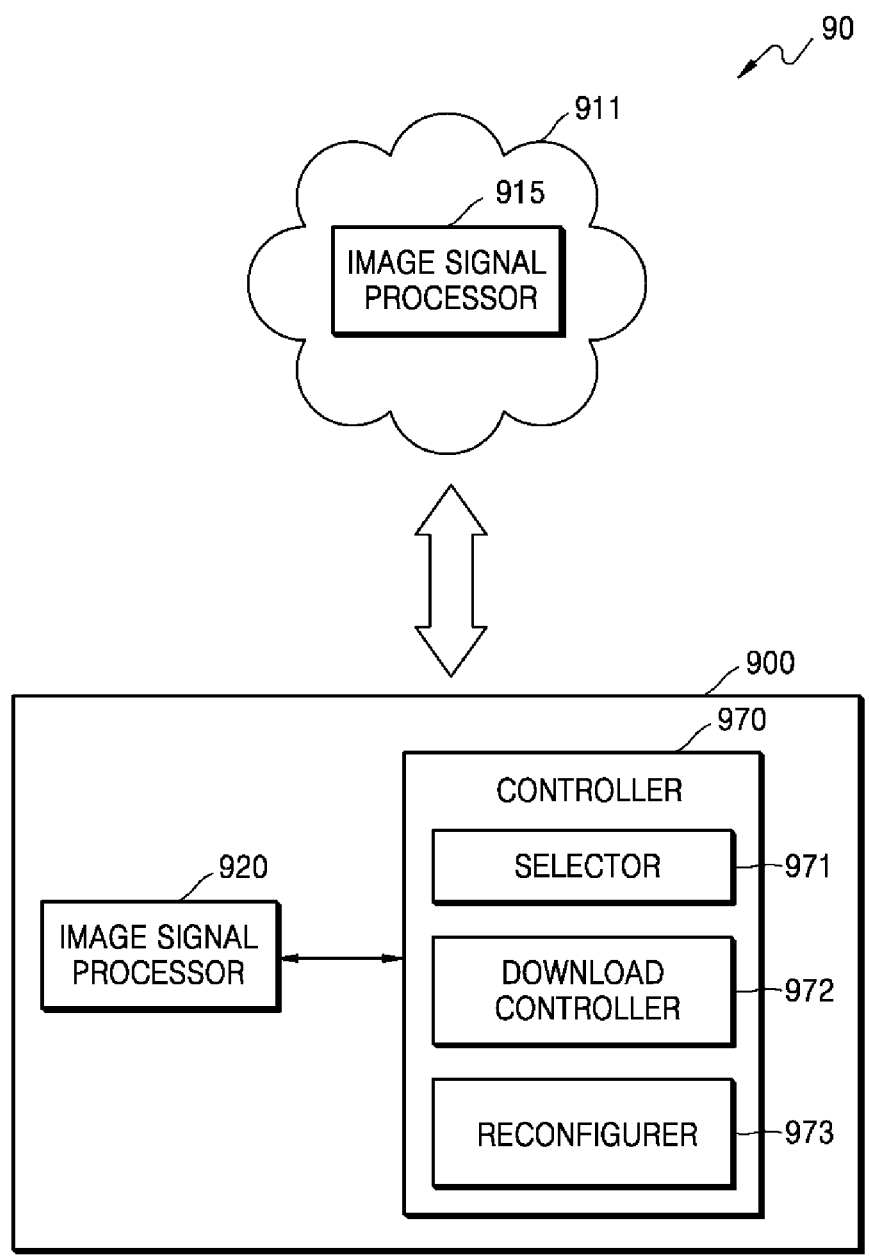
FIG. 9 is a block diagram illustrating a system for controlling a digital photographing apparatus, according to an aspect of an exemplary embodiment.

FIG. 9 is a block diagram illustrating a system 90 for controlling a digital photographing apparatus 900, according to an aspect of an exemplary embodiment.

As shown in FIG. 9, the digital photographing apparatus 900 may include an ISP 920 and a controller 970. The controller 970 may further include a selector 971, a download controller 972, and a reconfigurer 973.

The digital photographing apparatus 900 may process image processing operations of predetermined image signal processing modules by using a cloud server 911. For example, image signal processing modules requiring a relatively long processing time (for example, an augmented reality module, a shutter timer module, a histogram analysis module, a face recognition module, etc.) may be executed at high speed by using an ISP 915 of the cloud server 911 rather than the ISP 920 of the digital photographing apparatus 900.

That is, when the digital photographing apparatus 900 needs to perform an image signal processing operation, if the digital photographing apparatus 900 is connected to a cloud system, the digital photographing apparatus 900 may control some image signal processing modules to perform image signal processing operations by using the image signal processor 915 of the cloud server 911 instead of the image signal processor 920. An operating speed of the image signal processing module 920 may be used to determine whether to perform image signal processing operations using the image signal process 915.

According to an aspect of an exemplary embodiment, when the digital photographing apparatus 900 downloads at least one image signal processing module from a server 910 and reconfigures the ISP 920, the downloaded image signal processing module may not include all data necessary for an actual image processing operation. The downloaded image signal processing module may include only data necessary for transmitting and receiving to and from the cloud server 911. Therefore, in a specific image signal processing module, such as those having a high license cost, the digital photographing apparatus 900 may acquire a license for as many image signal processing modules provided by the cloud server 911 as necessary. A license and usage fee may be required for one or more of the image signal processing modules of the cloud server 911.

Figure 10:
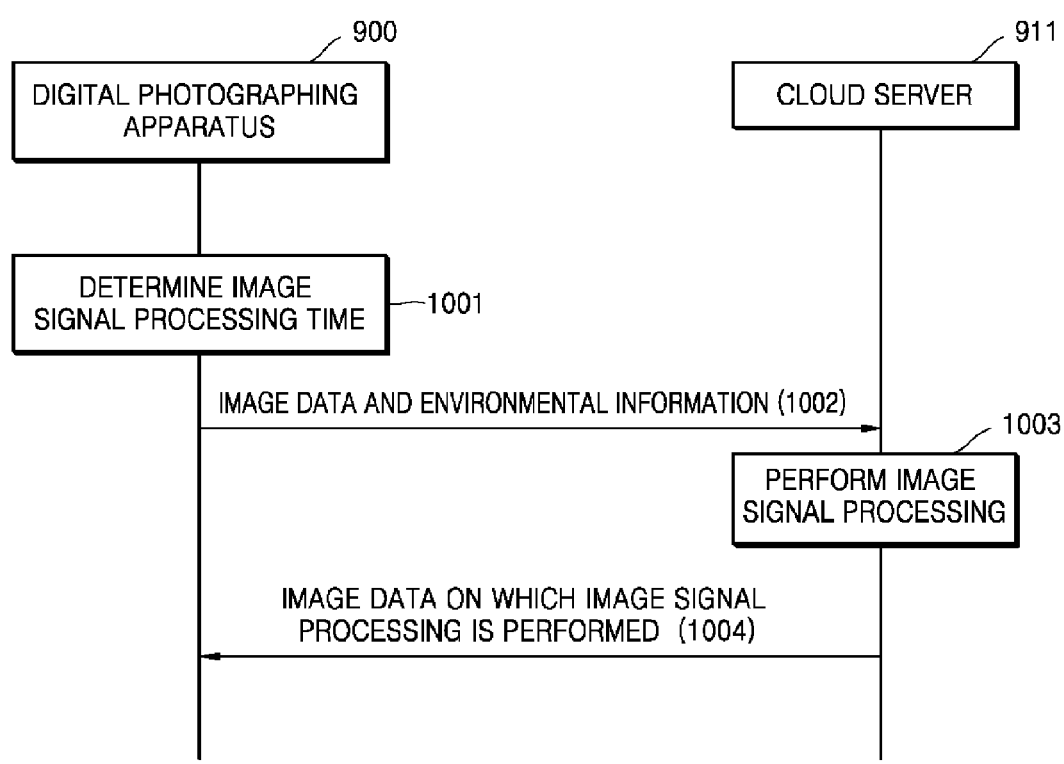
FIG. 10 is a block flow diagram illustrating a cloud server based image signal processing operation performed by a digital photographing apparatus, according to an aspect of an exemplary embodiment.

FIG. 10 is a block flow diagram illustrating a cloud server based image signal processing operation performed by the digital photographing apparatus 900, according to an aspect of an exemplary embodiment.

In operation 1001, the digital photographing apparatus 900 may determine an image signal processing time for a particular image signal processing module. For example, the digital photographing apparatus 900 may determine whether an operation of the image signal processing module takes a relatively long time or is an operation that may be processed by the ISP 920 included in the digital photographing apparatus 900.

In operation 1002, the digital photographing apparatus 900 may transmit image data on which an image signal processing operation is to be performed, and environmental information of a place where the digital photographing apparatus 900 is located to the cloud server 911. That is, the digital photographing apparatus 900 may transmit data to allow the cloud server 911 to perform the image signal processing operation. The environmental information may include weather, location, time, etc.

In operation 1003, the cloud server 911 may perform an image signal processing operation on the received image data.

In operation 1004, upon completion of the image signal processing operation, the cloud server 911 may transmit processed image data to the digital photographing apparatus 900.

As described above, the digital photographing apparatus 900 uses a cloud server 911 to perform an operation of an image signal processing module requiring a relatively long processing time, thereby enhancing an operating speed of the image signal processing module.

Figure 11:
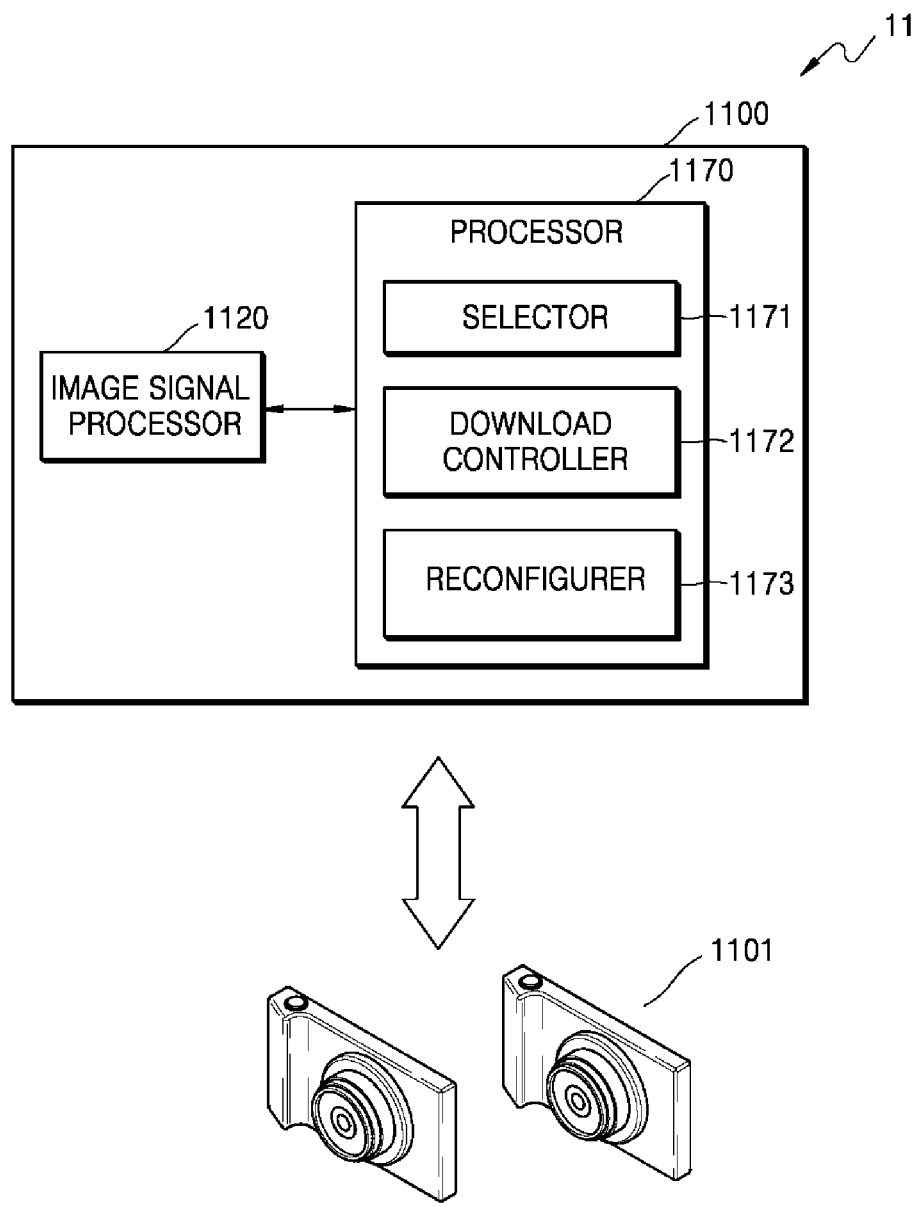
FIG. 11 is a diagram illustrating a system for controlling a digital photographing apparatus, according to an aspect of an exemplary embodiment.

FIG. 11 illustrates a system 11 for controlling a digital photographing apparatus 1100, according to an aspect of an exemplary embodiment.

As shown in FIG. 11, the digital photographing apparatus 1100 may include an ISP 1120 and a controller 1170. The controller 1170 may further include a selector 1171, a download controller 1172, and a reconfigurer 1173.

The digital photographing apparatus 1100 may download at least one image signal processing module from another digital photographing apparatus 1101. The digital photographing apparatus 1100 may install the downloaded at least one image signal processing module, and thereby reconfigure the ISP.

Figure 12:
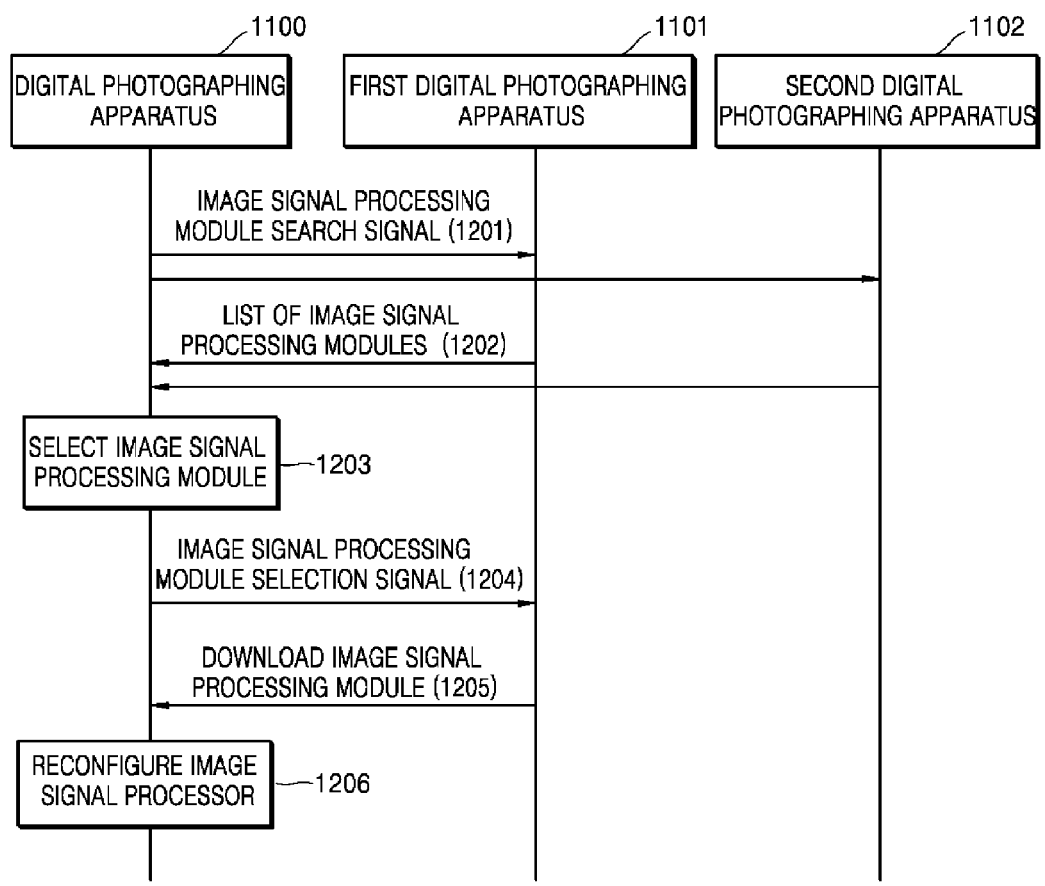
FIG. 12 is a flowchart illustrating an operation of a digital photographing apparatus downloading image signal processing modules from two digital photographing apparatuses, according to an aspect of an exemplary embodiment.

FIG. 12 is a flowchart illustrating an operation of the digital photographing apparatus 1100 and a second digital photographing apparatus 1102, according to an aspect of an exemplary embodiment.

In operation 1201, the digital photographing apparatus 1100 may transmit image signal processing module search signals over a network to the first digital photographing apparatus 1101, and the second digital photographing apparatus 1102. The network may be wired or wireless, near distance or wide area data transmission and reception network used to transmit and receive data between digital photographing apparatuses.

In operation 1202, the first digital photographing apparatus 1101 and the second digital photographing apparatus 1102 may provide a list of image signal processing modules which are owned by them and correspond to the search signals. The list of image signal processing modules may be received, for example, via the server 610 of FIG. 6. That is, when the first digital photographing apparatus 1101 and the second digital photographing apparatus 1102 provide the list of image signal processing modules that they own in a cloud server to the server 610 of FIG. 6, and the digital photographing apparatus 1100 requests the list of image signal processing modules, the first digital photographing apparatus 1101 and the second digital photographing apparatus 1102 may provide the list of their own image signal processing modules to the digital photographing apparatus 1100. The first digital photographing apparatus 1101 and the second digital photographing apparatus 1102 may be relatively close to the digital photographing apparatus 1100. Alternatively, the first digital photographing apparatus 1101 and the second digital photographing apparatus 1102 may be located farther away, and the image signal processing modules may be provided to the digital photographing apparatus 1100 over the network.

In operation 1203, the digital photographing apparatus 1100 may select at least one image signal processing module from the received list of image signal processing modules, and, in operation 1204, may transmit an image signal processing module selection signal to the first digital photographing apparatus 1101 that owns the selected image signal processing module.

In operation 1205, the first digital photographing apparatus 1101 that receives the image signal processing module selection signal may transmit the selected image signal processing module to the digital photographing apparatus 1100.

In operation 1206, the digital photographing apparatus 1100 may reconfigure the ISP 1120 by using a downloaded image signal processing module.

As described above, according to one or more aspects of the exemplary embodiments, the digital photographing apparatuses 100, 600, 900, and 1100 may reconfigure an ISP by selectively downloading image signal processing modules. Thus, the digital photographing apparatuses 100, 600, 900, and 1100 may be lightweight with an increased processing speed.

Aspects of the exemplary embodiments in which the software modules constituting the ISP 120 of the digital photographing apparatuses 100, 600, 1000, and 1200 are exchanged are described above with reference to FIGS. 1 through 12, but are not limited thereto.

As described above, the hardware modules constituting the ISP 120 may be exchanged. Furthermore, all hardware modules constituting the capturer 110, the ISP 120, the analog signal processor 121, the memory 130, the storage read controller 140, the data storer 142, the program storer 150, the display driver 162, the display 164, the controller 170, and the operator 180 included in the digital photographing apparatus 100 may be exchanged. Hereinafter, a method of controlling a digital photographing apparatus 1300 of which hardware modules may be exchanged will be described with reference to FIGS. 13A through 18. Meanwhile, the digital photographing apparatus 1300 may correspond to the digital photographing apparatuses 100, 600, 900, and 1100 described with reference to FIGS. 1 through 12 above. Thus, although omitted below, the digital photographing apparatus 1300 may perform the operations described with reference to the digital photographing apparatuses 100, 600, 900, and 1100 above.

Figure 13B:
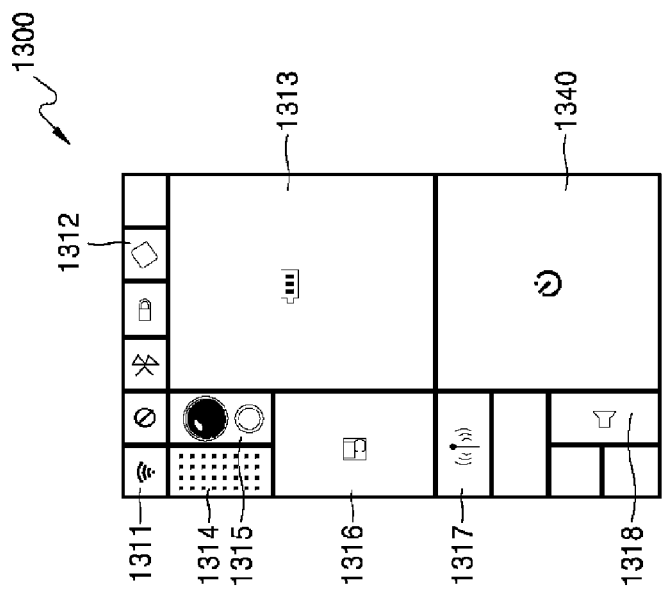
FIG. 13B is a block diagram illustrating exchangeable hardware modules of a digital photographing apparatus, according to an aspect of an exemplary embodiment.
Figure 13A:
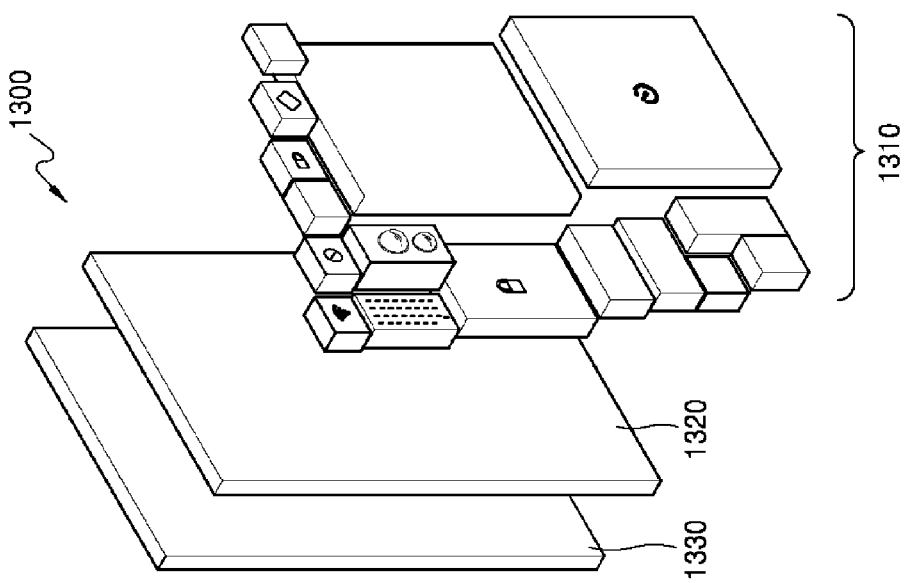
FIG. 13A is an exploded view illustrating exchangeable hardware modules of a digital photographing apparatus, according to an aspect of an exemplary embodiment.

FIG. 13A is an exploded view illustrating a digital photographing apparatus 1300 including exchangeable hardware modules, according to an aspect of an exemplary embodiment. FIG. 13B is a block diagram illustrating the digital photographing apparatus 1300 including exchangeable hardware modules, according to an aspect of an exemplary embodiment.

As shown in FIG. 13A, the digital photographing apparatus 1300 may include a hardware module 1310, a connection board 1320, and a display 1330.

The hardware module 1310, the connection board 1320, and the display 1330 may be electrically connected to each other. In more detail, a plurality of hardware modules included in the hardware module 1310 may include a contact, and may be electrically connected to the connection board 1320.

As shown in FIG. 13B, the digital photographing apparatus 1300 may include a wireless communication module 1311 (Bluetooth, WiFi, LTE, etc.), a location sensing module 1312 (a GPS, a gyro sensor, etc.), a battery module 1313, a control module 1340, a speaker module 1314, a camera module 1315, a storage medium module 1316, an antenna module 1317, and an audio module 1318. Each of these hardware modules may be changed by exchanging corresponding hardware modules of various performances and manufacturers.

However, a driver of a hardware module is necessary to normally connect and use exchanged hardware modules in the digital photographing apparatus 1300.

The driver may be software configured to control input and output of the hardware modules constituting the digital photographing apparatus 1300. The driver may receive an input command and an output command from an operating system of the digital photographing apparatus 1300. The driver may control peripheral devices according to the received input and output commands. The peripheral devices may be categorized into various types and have various control methods. Thus, in general, the input and output command received from the operating system to the driver has a unified format, while each of the peripheral devices is uniquely controlled by using the driver. When a new peripheral device emerges, the operating system may not be able to control the peripheral devices without related drivers. Thus, the digital photographing apparatus 1300 may install drivers related to the exchanged hardware modules, thereby reconfiguring the hardware modules and enabling control of the exchanged hardware modules.

However, it is very inconvenient for the user to personally reinstall the driver every time a hardware module is exchanged. Furthermore, the plurality of hardware modules of the digital photographing apparatus 1300 individually operate. Compatibility between the exchanged hardware modules, and performance thereof, may differ according to a type of the driver. Thus, when the user personally reinstalls the driver, it may be difficult to consider compatibility between the driver and the hardware modules of the digital photographing apparatus 1300.

Therefore, according to an aspect of an exemplary embodiment, the digital photographing apparatus 1300 may use a cloud server to easily download an optimized driver related to the exchanged hardware modules. Thus, the user may conveniently use the exchanged hardware modules.

Furthermore, the digital photographing apparatus 1300 may reconfigure the hardware modules based on the particular version of the driver being used. Various driver versions may selectively enable functions of the exchanged hardware modules. For example, a hardware module seller may provide a driver version to consumers having a limited function available for a hardware module. Thus, the user may selectively purchase a driver according to the required function for the hardware module. The user may install the driver in the digital photographing apparatus 1300 in order to use a specific function of the hardware module.

Hereinafter, a method of controlling the digital photographing apparatus 1300 according to an aspect of an exemplary embodiment will be described with reference to FIGS. 14 through 18.

Figure 14:
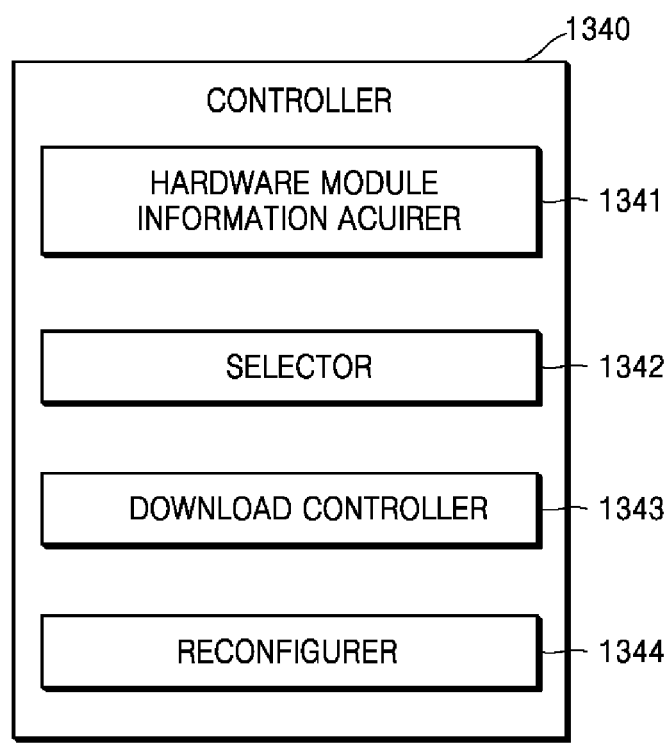
FIG. 14 is a block diagram illustrating a digital photographing apparatus controller, according to an aspect of an exemplary embodiment.

FIG. 14 is a block diagram illustrating a structure of a controller 1340 of the digital photographing apparatus 1300 of which hardware modules are exchangeable, according to an embodiment.

As shown in FIG. 14, the controller 1340 of the digital photographing apparatus may include a hardware module information acquirer 1341, a selector 1342, a download controller 1343, and a reconfigurer 1344.

The hardware module information acquirer 1341 may detect exchanged hardware modules. According to an aspect of an exemplary embodiment, the hardware module information acquirer 1341 may read hardware module information when the digital photographing apparatus 1300 is powered on, and determine whether there are one or more exchanged hardware modules.

According to an aspect of an exemplary embodiment, the hardware module information acquirer 1341 may acquire the hardware module information, and detect changes thereof at regular intervals.

The selector 1342 may provide a list of a plurality of drivers related to the exchanged hardware modules based on the exchanged hardware modules. According to an aspect of an exemplary embodiment, the selector 1342 may transmit the exchanged hardware module information to an external system, receive information regarding the plurality of drivers related to the exchanged hardware modules from a cloud server, and provide the list of the drivers to a user through the display 1330.

The external system may be, for example, a market server providing an online market capable of transacting the drivers. The cloud server may be connected to the digital photographing apparatus 1300, or another digital photographing apparatus. According to an aspect of an exemplary embodiment, if the external system is the market server, when the user pays for a selected driver by using a payment means, the selector 1342 may complete the driver transaction.

According to an aspect of an exemplary embodiment, the digital photographing apparatus 1300 may be loaded with drivers for a predetermined number of hardware modules in advance. Thus, the selector 1342 may provide a list of drivers included in the digital photographing apparatus 1300 without transmitting data to the external system.

Prior to providing the list of the drivers related to the exchanged hardware modules, the selector 1342 may receive a selection of whether to provide the list of the drivers through a popup window.

According to an aspect of an exemplary embodiment, the selector 1342 may provide a list of one or more applications related to the exchanged hardware modules among the plurality of applications installed in the digital photographing apparatus 1300.

According to an aspect of an exemplary embodiment, compatibility of one or more of the applications installed in the digital photographing apparatus 1300, or a function of using the applications, may be changed by exchanging one or more of the hardware modules of the digital photographing apparatus 1300. Thus, the selector 1342 may provide the list of applications so an application version may be downloaded to enable a new function. The new function may be available due to an exchange of the hardware modules with respect to the applications installed in the digital photographing apparatus 1300 or an application version optimized to the exchanged hardware module.

According to an aspect of an exemplary embodiment, the download controller 1343 may download a driver selected from the provided list from the external system. For example, if a user input selects one of the drivers included in the list, the download controller 1343 may transmit a data request signal regarding the selected driver to the external system, and download data regarding the selected driver from the external system.

According to an aspect of an exemplary embodiment, the download controller 1343 may control to download and install (or update) an application selected from the list of applications related to the exchanged hardware modules.

According to an aspect of an exemplary embodiment, the reconfigurer 1344 may reconfigure the exchanged hardware modules by using the downloaded driver. Thus, the controller 1340 may control the exchanged hardware modules by using the reconfigured exchanged hardware modules.

Different functions may be available through the exchanged hardware modules according to the drivers provided in the list. For example, when a camera module is exchanged, a specific driver may support an optical hand shaking correction, while another specific driver may not support the optical hand shaking correction.

Therefore, the user may prioritize expenses according to necessary functions, selectively download necessary drivers, and reconfigure an exchanged hardware module.

Figure 15:
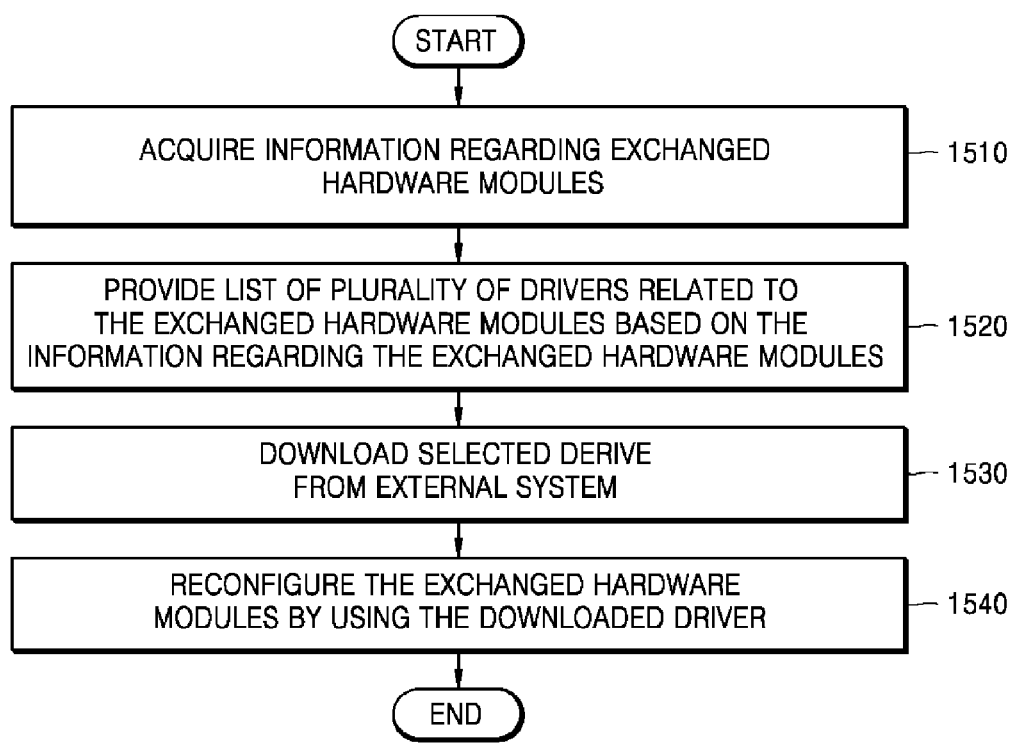
FIG. 15 is a flowchart illustrating a method of controlling a digital photographing, according to an aspect of an exemplary embodiment.

FIG. 15 is a flowchart illustrating a method of controlling the digital photographing apparatus 1300 of which hardware modules are exchangeable, according to an aspect of an exemplary embodiment.

In operation 1510, the digital photographing apparatus 1300 may acquire information of exchanged hardware modules. According to an aspect of an exemplary embodiment, when the digital photographing apparatus 1300 is powered off, and hardware modules are exchanged, hardware module exchange information may be acquired when the digital photographing apparatus 1300 is powered on.

In operation 1520, the digital photographing apparatus 1300 may provide a list of a plurality of drivers related to the exchanged hardware modules based on the hardware module exchange information.

According to an aspect of an exemplary embodiment, the digital photographing apparatus 1300 may receive a selection of whether to provide the list of the drivers through a popup window before providing the list of the drivers related to the exchanged hardware modules.

Figure 16:
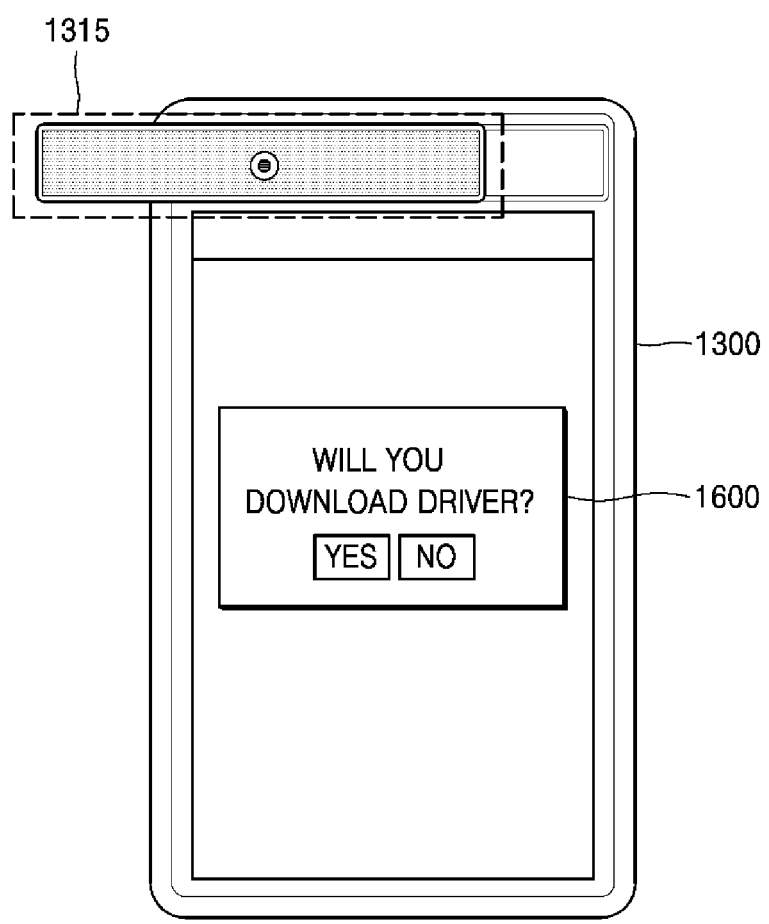
FIG. 16 is a diagram illustrating an exchangeable hardware module and a digital photographing apparatus, according to an aspect of an exemplary embodiment.

FIG. 16 is a diagram illustrating a case where a hardware module of the digital photographing apparatus 1300 is exchanged, according to an aspect of an exemplary embodiment.

As shown in FIG. 16, when a camera module 1315 of the digital photographing apparatus 1300 is exchanged, the digital photographing apparatus 1300 may display a popup window 1600 inquiring whether to download a driver according to an exchange of the camera module 1315.

The digital photographing apparatus 1300 may determine whether the hardware module is exchanged when the digital photographing apparatus 1300 is changed from an off status to an on status. The camera module 1315 may also be exchanged when the digital photographing apparatus 1300 is powered on. The digital photographing apparatus 1300 may determine whether the hardware module is exchanged at a regular interval, and acquire information regarding the exchanged hardware module.

Figure 17:
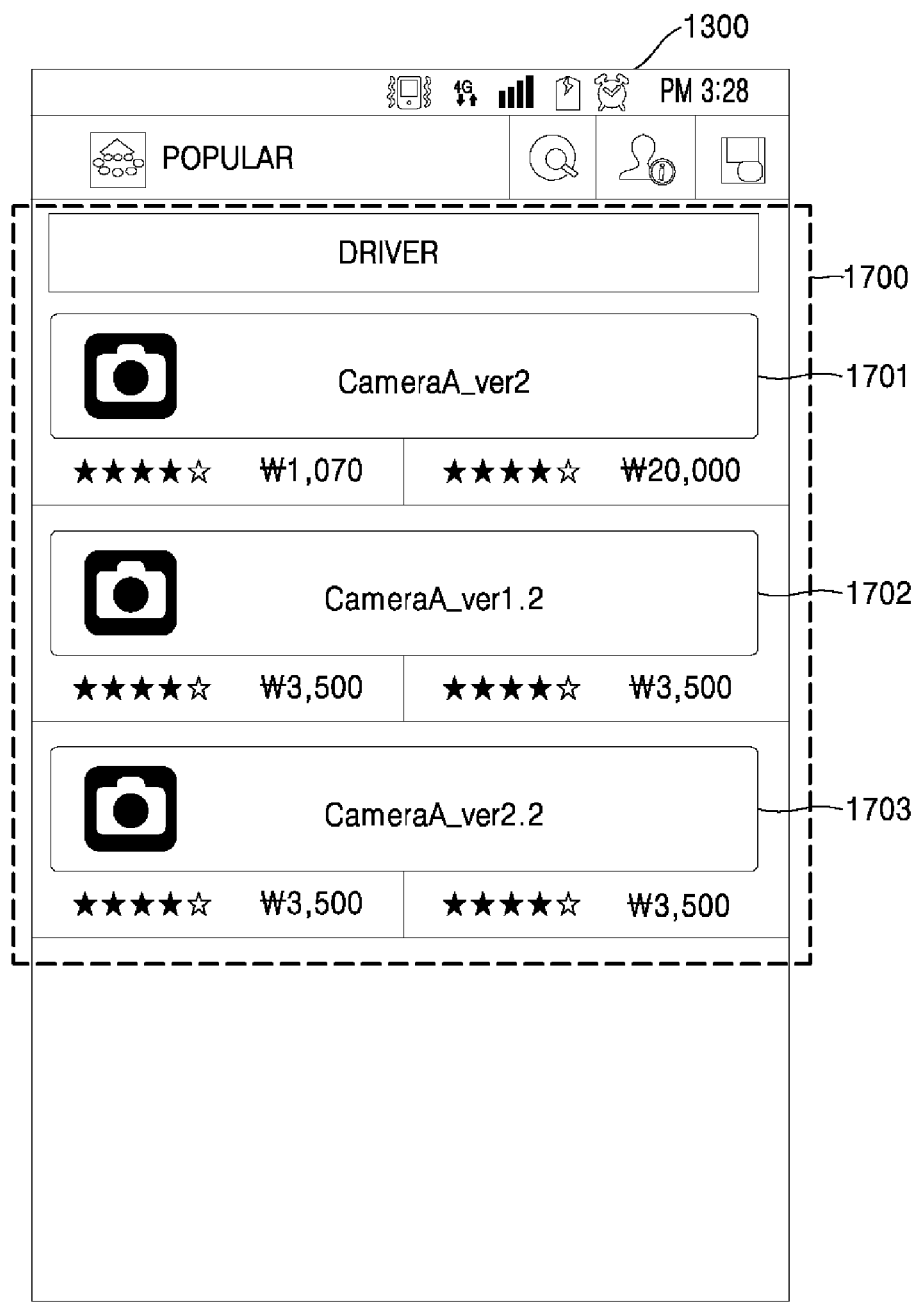
FIG. 17 is a diagram illustrating a digital photographing apparatus providing a list of drivers, according to an aspect of an exemplary embodiment.

FIG. 17 is a diagram illustrating a case where the digital photographing apparatus 1300 provides a list of drivers related to hardware modules, according to an aspect of an exemplary embodiment.

As shown in FIG. 17, when a camera module is exchanged, the digital photographing apparatus 1300 may provide a list 1700 of a plurality of drivers according to a manufacturer and function of the exchanged camera module. In this regard, a first driver 1701, a second driver 1702, and a third driver 1703 of the list 1700 may provide different functions at different prices. For example, the first driver 1701 may enable the most functions of the camera module at a highest price. Meanwhile, the second driver 1702 may enable only basic functions of the camera module at a lower price. The third driver 1703 may be a different version of the second driver 1702 and offer similar functions at the same price. For example, the third driver 1703 may be an updated version offering improved stability and performance.

Therefore, the digital photographing apparatus 1300 may reconfigure an exchangeable hardware module by downloading a driver selected according to a necessity of a user.

As shown in FIG. 15, in operation 1530, the digital photographing apparatus 1300 may download the selected driver from an external system. For example, if a user input selects one of the drivers from the, the download controller 1343 may transmit a data request signal regarding the selected driver to the external system and download the selected driver from the external system.

In operation 1540, the digital photographing apparatus 1300 may reconfigure the exchanged hardware module by using the downloaded driver. Thus, the controller 1340 of the digital photographing apparatus 1300 may control the exchanged hardware module through the reconfigured hardware module.

The digital photographing apparatus 1300 may only enable functions supported by the driver installed through the exchanged hardware module.

According to an aspect of an exemplary embodiment, after a hardware module is exchanged, the digital photographing apparatus 1300 may update and provide a list of applications related to the exchanged hardware module, from among installed applications. The exchanged hardware module may offer different compatibility or available functions, and thereby a user may desire a different application or version.

Figure 18:
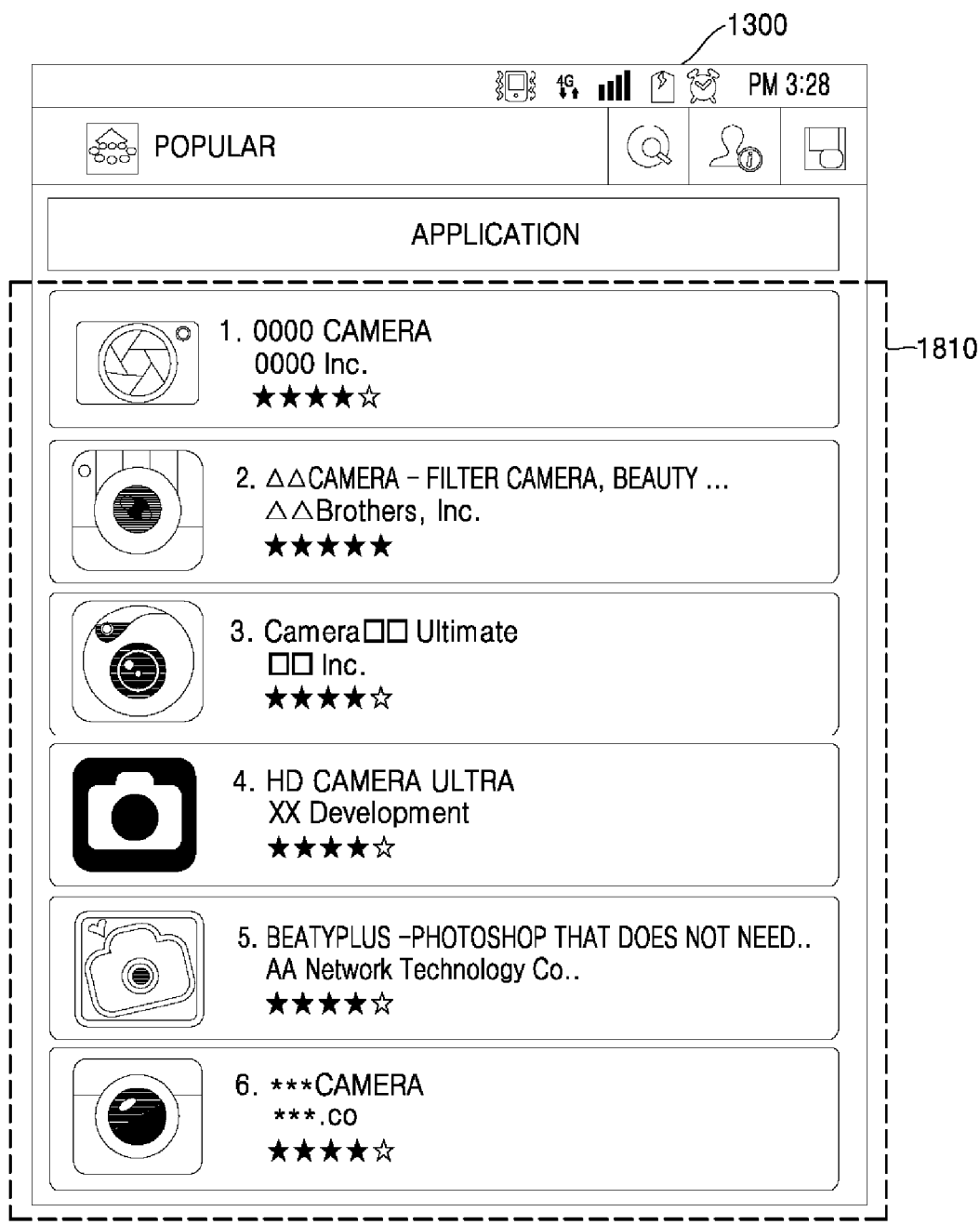
FIG. 18 is a diagram illustrating a digital photographing apparatus providing a list of applications, according to an aspect of an exemplary embodiment.

For example, FIG. 18 is a diagram illustrating an aspect of an exemplary embodiment where the digital photographing apparatus 1300 provides a list of applications related to hardware modules.

As shown in FIG. 18, when the camera module 1315 is exchanged, the digital photographing apparatus 1300 may provide a list 1810 of applications related to the exchanged camera module 1315.

According to an aspect of an exemplary embodiment, the digital photographing apparatus 1300 may determine whether there is an updated version of an application that may use a new function available in the exchanged camera module 1315 or an updated version of an application optimized for the exchanged camera module 1315. The determination may be made by using the external system, and the list 1810 of the related applications may be provided according to a determination result.

The list 1810 of the applications related to the exchanged hardware module may not only include an updated list of applications previously installed in the digital photographing apparatus 1300, but also a list of applications of which installation is recommended according to the exchanged hardware module. For example, a list of applications that are frequently used by users of a particular hardware module may also be provided.

Therefore, when a hardware module is exchanged, the digital photographing apparatus 1300 may automatically acquire and provide an application version that may use a new function of the exchanged hardware module. A list of application versions optimized to the exchanged hardware module to the user may also be provided, thereby promoting user convenience and improving performance of the digital photographing apparatus 1300.

It will be understood by those of ordinary skill in the art that although the above description provided with reference to FIGS. 16 through 18 relates to a case in which the camera module 1315 is exchanged, the description may be also applied to a case in which one or more other hardware modules are exchanged, such as the wireless communication module 1311 (Bluetooth, WiFi, LTE, etc.), the location sensing module 1312 (a GPS, a gyro sensor, etc.), the battery module 1313, the control module 1340, the speaker module 1314, the storage medium module 1316, the antenna module 1317, and the audio module 1318.

The device described herein may comprise a processor for executing program data, a memory for storing program data, a permanent storage such as a disk drive, a communications port for communicating with external devices, and user interface devices such as a display, keys, etc. Software modules may be stored as program instructions or executable computer readable codes on a computer-readable media. Computer-readable media may include read-only memory (ROM), random-access memory (RAM), CD-ROMs, magnetic tapes, floppy disks, and optical data storage devices. The computer readable recording medium can also be connected over network coupled computer systems so that the computer readable code is stored and executed in a distributed fashion. This media can be read by the computer, stored in the memory, and executed by the processor.

It should be understood that the exemplary embodiments described herein should be considered in a descriptive sense only and not for purposes of limitation. Descriptions of features or aspects within each embodiment should typically be considered as available for other similar features or aspects in other embodiments. It will be understood by those of ordinary skill in the art that while one or more embodiments have been described with reference to the figures, various changes in form and details may be made therein without departing from the spirit and scope as defined by the following claims.

What is claimed is:

1. A method of controlling a digital photographing apparatus capable of reconfiguring an image signal processor (ISP), the method comprising:
   receiving a selection of at least one image signal processing module that is to be installed in the ISP;
   downloading the selected at least one image signal processing module from an external system;
   reconfiguring the ISP by using the downloaded at least one image signal processing module; and
   performing an image processing operation on an image using the downloaded at least one image signal processing module,
   wherein the performing the image processing operation comprises determining whether to perform the image processing operation on the digital photographing apparatus or on the external system based on a required processing time of the downloaded at least one image signal processing module.

2. The method of claim 1, wherein the receiving of the selection comprises:
   receiving a list of image signal processing modules stored in the external system; and
   receiving the selection of at least one image signal processing module from among the received list of image signal processing modules.

3. The method of claim 2, wherein the receiving of the selection comprises:
   transmitting information regarding the digital photographing apparatus to the external system;
   searching the external system for one or more image signal processing modules corresponding to the information regarding the digital photographing apparatus; and
   receiving a list of found image signal processing modules from the external system.

4. The method of claim 2, wherein the list of image signal processing modules comprises capacity and download count information for each of the image signal processing modules included in the list.

5. The method of claim 1,
   wherein the performing the image processing operation comprises transmitting the image to the external system and receiving processed image data from the external system in response to an operating speed of the ISP indicating a relatively long processing time.

6. The method of claim 1, wherein the external system is at least one of a market server providing an online market capable of transacting the at least one image signal processing module, a cloud server connected to the digital photographing apparatus, and another digital photographing apparatus.

7. The method of claim 1,
   wherein the external system is a cloud server connected to the digital photographing apparatus, and
   the performing the image processing operation comprises uploading image data and environmental information to the cloud server and receiving processed image data from the cloud server.

8. The method of claim 1, wherein, the receiving of the selection comprises:
   receiving a list of image signal processing modules stored in a second digital photographing apparatus through a cloud server; and
   receiving the selection of at least one image signal processing module from among the received list of image signal processing modules.

9. A non-transitory computer-readable recording medium having recorded thereon a program, which, when executed by a computer, performs the method of claim 1.

10. A digital photographing apparatus comprising:
    an image signal processor (ISP) configured to perform an image processing operation corresponding to a predetermined image signal processing module; and
    a controller configured to receive a selection of at least one image signal processing module that is to be installed in the ISP, control the selected at least one image signal processing module to be downloaded from an external system, reconfigure the ISP by using the downloaded at least one image signal processing module, and perform the image processing operation on an image using the downloaded at least one image signal processing module,
    wherein the image processing operation comprises determining whether to perform the image processing operation on the digital photographing apparatus or on an external system based on a required processing time of the downloaded at least one image signal processing module.

11. The digital photographing apparatus of claim 10, wherein the controller is further configured to receive a list including information regarding image signal processing modules registered in the external system, and receive the selection of at least one image signal processing module from among the received list of image signal processing modules.

12. The digital photographing apparatus of claim 11, wherein the controller is further configured to transmit information regarding the digital photographing apparatus to the external system, and receive a list of image signal processing modules corresponding to the information regarding the digital photographing apparatus.

13. The digital photographing apparatus of claim 11, wherein the information regarding the image signal processing modules comprises capacity and download count for each of the image signal processing modules.

14. The digital photographing apparatus of claim 10, wherein the external system is one of a market server configured to provide an online market capable of transacting the at least one image signal processing module, a cloud server connected to the digital photographing apparatus, and a second digital photographing apparatus.

15. A system for controlling a digital photographing apparatus, the system comprising the digital photographing apparatus and an external system configured to provide a plurality of image signal processing modules to the digital photographing apparatus,
    wherein the digital photographing apparatus comprises:
    an image signal processor (ISP) configured to perform an image processing operation corresponding to a predetermined image signal processing module; and
    a controller configured to receive a selection of at least one image signal processing module that is to be installed in the ISP, control the selected at least one image signal processing module to be downloaded from the external system, reconfigure the ISP by using the downloaded at least one image signal processing module, and perform the image processing operation on an image using the downloaded at least one image signal processing module,
    wherein the image processing operation comprises determining whether to perform the image processing operation on the digital photographing apparatus or on the external system based on a required processing time of the downloaded at least one image signal processing module.

16. The system of claim 15, wherein the external system comprises a server image signal processor configured to perform an external image processing operation corresponding to the at least one image signal processing module downloaded by the digital photographing apparatus.

17. A method of controlling a digital photographing apparatus of which hardware modules are exchangeable, the method comprising:
    acquiring information regarding exchanged hardware modules;
    providing a list of a plurality of drivers related to the exchanged hardware modules based on the information regarding the exchanged hardware modules;

downloading a driver selected from the provided list from an external system;

reconfiguring the exchanged hardware modules by using the downloaded driver; and performing an image processing operation on an image using the downloaded driver, wherein the performing the image processing operation comprises determining whether to perform the image processing operation on the digital photographing apparatus or on the external system based on a required processing time of the downloaded driver.

18. The method of claim 17, wherein functions available from the exchanged hardware modules are different according to each of the plurality of drivers provided from the list.

19. The method of claim 17, further comprising:

providing an application list related to the exchanged hardware modules installed in the digital photographing apparatus; and downloading and installing an application selected from the application list based on a user input.

20. An apparatus for controlling a digital photographing apparatus of which hardware modules are exchangeable, the apparatus comprising:

a connection board configured to connect hardware modules to the apparatus; and a controller configured to acquire information regarding exchanged hardware modules, provide a list of a plurality of drivers related to the exchanged hardware modules based on the information regarding the exchanged hardware modules, control a driver selected from the provided list to be downloaded from an external system, reconfigure the exchanged hardware modules by using the downloaded driver, and perform an image processing operation on an image using the downloaded driver, wherein the image processing operation comprises determining whether to perform the image processing operation on the digital photographing apparatus or on to the external system based on a required processing time of the downloaded driver.

* * * * *